United States Patent
Brantley et al.

(10) Patent No.: US 9,362,582 B2
(45) Date of Patent: Jun. 7, 2016

(54) FLOW CELL STACK WITH SINGLE PLATE CELLS

(71) Applicant: Imergy Power Systems Inc., Fremont, CA (US)

(72) Inventors: Jennifer Brantley, Fremont, CA (US); Reinder J. Boersma, Webster, MA (US); Derek Kwok, Castro Valley, CA (US)

(73) Assignee: IMERGY POWER SYSTEMS, INC., Fremont, CA (US)

( * ) Notice: Subject to any disclaimer, the term of this patent is extended or adjusted under 35 U.S.C. 154(b) by 89 days.

(21) Appl. No.: 14/484,929

(22) Filed: Sep. 12, 2014

(65) Prior Publication Data

US 2016/0079624 A1 Mar. 17, 2016

(51) Int. Cl.
*H01M 8/18* (2006.01)
*H01M 8/20* (2006.01)

(52) U.S. Cl.
CPC .............. *H01M 8/188* (2013.01); *H01M 8/20* (2013.01)

(58) Field of Classification Search
CPC .............. H01M 8/188; H01M 10/052; H01M 2200/00; H01M 2200/20; H01M 2/12; H01M 2/1229; H01M 2/1241; H01M 2/1276; H01M 2/34; H01M 2/345; H01M 8/0284; H01M 8/04276; H01M 8/1016; H01M 8/20; H01M 8/246; H01M 8/248
See application file for complete search history.

(56) References Cited

U.S. PATENT DOCUMENTS

| | | | |
|---|---|---|---|
| 6,555,267 B1 * | 4/2003 | Broman | H01M 8/0273 429/105 |
| 7,927,731 B2 | 4/2011 | Sahu | |
| 2010/0136455 A1 | 6/2010 | Winter | |
| 2012/0208061 A1 | 8/2012 | Sahu et al. | |
| 2013/0022846 A1 * | 1/2013 | Liu | H01M 8/188 429/81 |
| 2013/0089767 A1 * | 4/2013 | Blacker | H01M 8/188 429/105 |
| 2013/0095362 A1 | 4/2013 | Keshavarz et al. | |
| 2015/0125768 A1 * | 5/2015 | Mosso | H01M 8/0273 429/418 |

* cited by examiner

*Primary Examiner* — Carlos Barcena
(74) *Attorney, Agent, or Firm* — Haynes and Boone, LLP

(57) ABSTRACT

A flow-field plate for a flow stack in a flow cell battery system is described. The flow-field plate includes first electrolyte channels formed in a molded plate to direct a first electrolyte to a first flow-field on a first side of the molded plate and second electrolyte channels formed in the molded plate to direct a second electrolyte to a second flow-field on the second side of the molded plate.

22 Claims, 22 Drawing Sheets

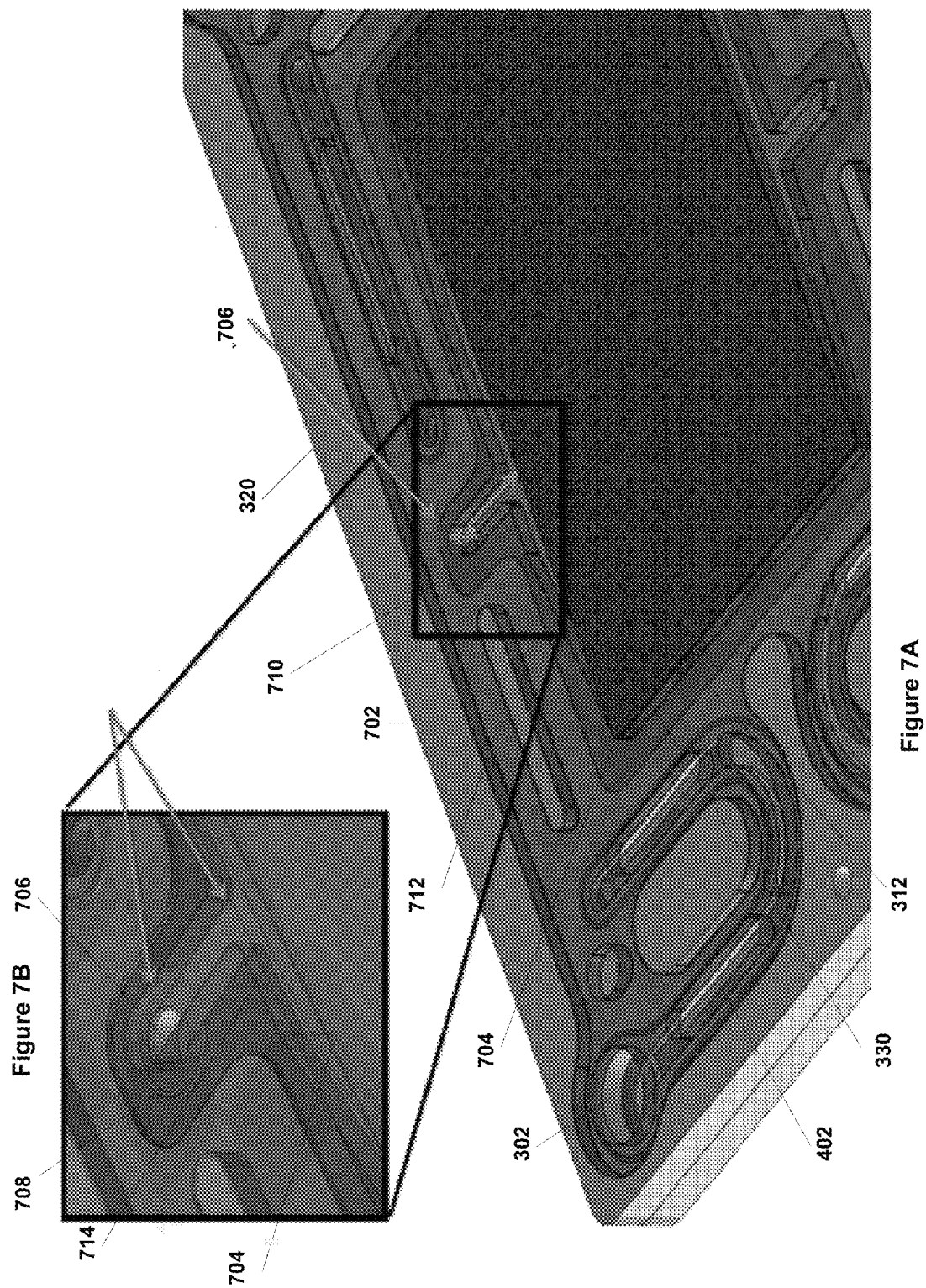

US 9,362,582 B2

FLOW CELL STACK WITH SINGLE PLATE CELLS

BACKGROUND

1. Technical Field

The present disclosure relates to a flow cell system and, in particular, to a flow cell stack with a single plate construction.

2. Discussion of Related Art

There is an increasing demand for novel and innovative electric power storage systems. Redox flow cell batteries have become an attractive means for such energy storage. In certain applications, a redox flow cell battery may include one or more redox flow cells. Each of the redox flow cells may include positive and negative electrodes disposed in separate half-cell compartments. The two half-cells may be separated by a porous or ion-selective membrane, through which ions are transferred during a redox reaction. Electrolytes (anolyte and catholyte) are flowed through the half-cells as the redox reaction occurs, often with an external pumping system. In this manner, the membrane in a redox flow cell battery operates in an aqueous electrolyte environment.

In order to provide a consistent supply of energy, it is important that many of the components of the redox flow cell battery system are performing properly. Redox flow cell battery performance, for example, may change based on parameters such as the state of charge, temperature, electrolyte level, concentration of electrolyte and fault conditions such as leaks, pump problems, and power supply failure for powering electronics.

One of the major components of a flow cell system is the flow cell stack. The minimal unit that performs the electrochemical energy conversion is generally called a "cell," whether in the case of flow batteries, fuel cells, or secondary batteries. A device that integrates many such cells, coupled electrically in series and/or parallel to get higher current, voltage, or both, is generally called a "battery." However, it is common to refer to any collection of coupled cells, including a single cell used on its own, as a battery stack or flow cell stack. As such, a single cell can be referred to interchangeably as a "cell" or a "battery."

Construction of a flow cell stack, whether it be a single cell or a stack of cells, has been problematic. Leakage of electrolytes from the cell can cause damage to surrounding components. Further, leakage of one electrolyte into another causes a drain of charge on the battery and may further cause heating or other stresses to occur with the stack. One challenge in the construction of flow cell stacks is their size and complexity. Reducing the size and the number of components in the stack can greatly reduce the cost of producing a flow cell battery system.

Therefore, there is a need for better construction of flow cell stacks.

SUMMARY

In accordance with some embodiments, a flow-field plate is provided. A flow-field plate according to some embodiments includes a molded plate having a first side and a second side; first electrolyte channels formed in the molded plate to direct a first electrolyte to a first flow-field on the first side of the molded plate; and second electrolyte channels formed in the molded plate to direct a second electrolyte to a second flow-field on the second side of the molded plate.

A flow stack according to some embodiments includes a plurality of flow-field plates, each of the plurality of flow-field plates include first electrolyte channels formed in the plate to direct a first electrolyte to a first flow field and second electrolyte channels formed in the plate to direct a second electrolyte to a second flow field; one or more membranes formed to fit within a depression in a corresponding one of the plurality of flow-field plates, each of the one or more membranes arranged such that the first flow field of one of the plurality of flow-field plates direct the first electrolyte across a first surface of membrane and the second flow field of an adjacent one of the plurality of flow-field plates directs the second electrolyte across a second surface of the membrane; bipolar-plates formed to fit within the depression in corresponding ones of the plurality of flow-field plates such that each of the one or more membranes is between bipolar plates; carbon felts positioned between the bipolar plates and the membranes; and a plurality of gaskets, each of the gaskets formed to engage adjacent pairs of the plurality of flow-field plates and seal the electrolyte channels.

These and other embodiments will be described in further detail below with respect to the following figures.

BRIEF DESCRIPTION OF THE DRAWINGS

FIGS. 7A and 7B illustrate a plate inserted with a flow-field plate according to some embodiments of the present invention.

Figure 1:
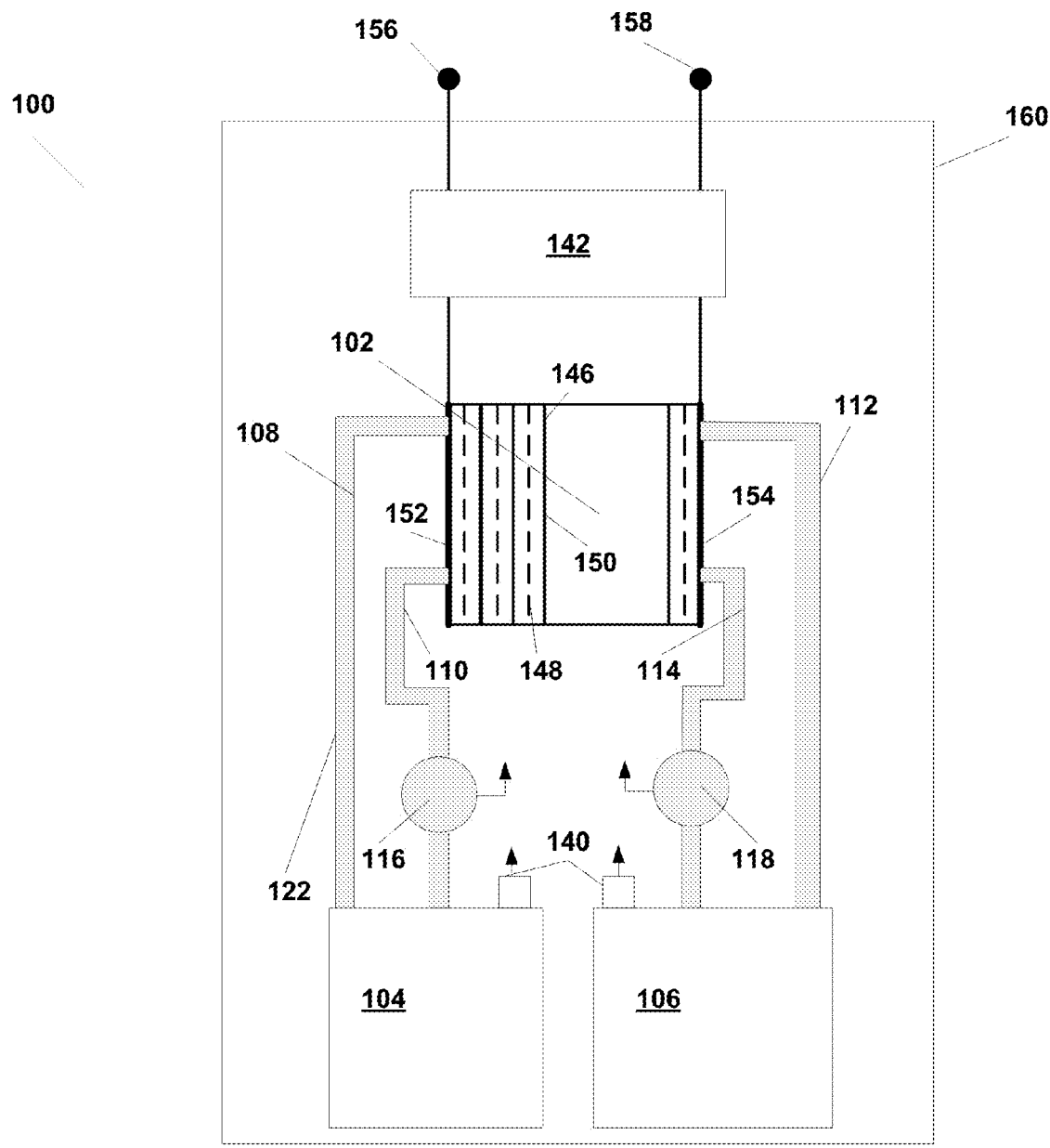
FIG. 1 illustrates a flow cell system according to some embodiments of the present invention.

The drawings may be better understood by reading the following detailed description. The drawings are not to scale.

DETAILED DESCRIPTION

In the following description, for the purposes of explanation, specific details are set forth in order to provide a thorough understanding of some embodiments of the invention. However, it will be apparent that the invention may be practiced without these specific details.

As used in the present specification, the following words and phrases are generally intended to have the meanings as set forth below, except to the extent that the context in which they are used indicates otherwise.

As described herein, the term "cell" refers generally to any unit capable of performing electrochemical energy conversion. Exemplary cells include, but are not limited to, redox flow batteries, fuel cells, and secondary batteries.

As described herein, the term "membrane" refers to any material that forms a barrier between fluids, for example between electrochemical half-cells (e.g., an anode compartment and a cathode compartment). Exemplary membranes may be selectively permeable, and may include porous membranes and ion-selective membranes. Exemplary membranes may include one or more layers, wherein each layer exhibits a selective permeability for certain species (e.g., ions), and/or affects the passage of certain species.

As described herein, the terms "fluid communication" or "fluidically coupled" refers to structures which are in contact with, but not necessarily affixed to, one another, whereby a fluid or gas can pass from one structure to the other. For example, two structures may be in fluid communication or may be fluidically coupled with one another by a channel, conduit, opening, and/or valve, even if the communication includes a valve in a closed state but provided that the valve may be opened, whereby a fluid or gas may be moved from one of the structures to the other. In addition, two structures may be considered to be in fluid communication with each other even in circumstances where one or more intermediate structures divert and/or interrupt the flow of the fluid or gas from the first structure to the second structure, so long as flow of the fluid or gas from the one or more intermediate structures to the second structure is ultimately possible.

As described herein, "stack" refers to a stack of electrochemical cells connected together electrically and fluidically.

FIG. 1A conceptually illustrates a flow cell system 100 according to some embodiments of the present invention. As shown in FIG. 1A, flow cell system 100 includes a stack 102. Stack 102 is a stacked arrangement of individual flow cells 146, each flow cell 146 including two half-cells separated by a membrane 148. Membrane 148 can be an ion permeable membrane as described, for example, in U.S. Pat. No. 7,927,731, which is herein incorporated by reference in its entirety. Further, each half-cell of cell 146 includes an electrode 150. The end cells include end electrodes 152 and 154. A controller 142 is coupled to end electrodes 152 and 154 to control charge into and out of stack 102. Controller 142 provides charge from stack 102 to terminals 156 and 158 when system 100 is discharging and receives charge from terminals 156 and 158 to provide to stack 102 when charging. Terminals 156 and 158 are, in turn, coupled to supply current to a load when system 100 is discharging and coupled to a current source (e.g., a wind generator, solar cells, diesel generator, power grid, or other source of power) for charging of system 100.

As illustrated in FIG. 1, electrolyte solutions are flowed through each of the half cells of cells 146. A catholyte is flowed through one of the half-cells and an anolyte is flowed through the other of the half cells. In some embodiments a vanadium based chemistry is utilized to hold charge and provide charge from stack 102 in system 100. Other chemistry systems can be utilized, for example some embodiments of the present invention use an iron/chromium chemistry in system 100.

The vanadium chemistry involves the reaction of $V^{3+}+e^-\rightarrow V^{2+}$ in the negative half-cell of cell 146 and $VO^{2+}+H_2O\rightarrow VO_2^{+}+2H^{+}+e^-$ ($V^{4+}\rightarrow V^{5+}+e^-$) in the positive half cell of cell 146. The theoretical open circuit voltage of each cell in stack 102 utilizing the vanadium chemistry is then 1.25V, (−0.25V from one half-cell and 1.00V from the other half-cell 108). The ions $H^+$ and $Cl^-$ may traverse membrane 148 during the reaction. A vanadium electrolyte that can be utilized in system 100 is further described in U.S. patent application Ser. No. 13/651,230, which is herein incorporated by reference in its entirety.

As illustrated in FIG. 1, the electrolytes are stored in tanks 104 and 106. Tank 104 is fluidically coupled to stack 102 through pipes 108 and 110. The electrolyte stored in tank 104 can be pumped through stack 102 by a pump 116. Similarly, tank 106 is fluidically coupled to stack 102 through pipes 112 and 114. Electrolyte from tank 106 can be pumped through stack 102 by pump 118.

As shown in FIG. 1, system 100 can be housed in a cabinet 160. As is further illustrated in FIG. 1, control system or controller 142 controls various aspects of system 100. Control system 142 controls the operation of stack 102 and electrolyte pumps 116 and 118 to charge and discharge system 100. Control system 142 can receive signals from various sensors 140 that provide data regarding the operation of system 100, including temperature, fluid levels, state of charge, and other operating parameters.

As discussed above, a Vanadium in HCl electrolyte can be utilized in system 100, as is further described in U.S. application Ser. No. 13/651,230. The following reactions may occur in electrochemical cells 146 of stack 102: In the positive half-cell (catholyte)

$$VOCl_2+H_2O+Cl^-\rightarrow VO_2Cl+2HCl+e^-;$$

In the negative half-cell (anolyte)

$$VCl_3+e^-\rightarrow VCl_2+Cl^-; \text{ and}$$

In the full cell 146

$$VOCl_2+H_2O+VCl_3\rightarrow VO_2Cl+2HCl+VCl_2.$$

The cell shown in FIG. 1 may utilize different reactions and different electrolyte chemistries than those described above. The above description is for exemplary purposes only.

Figure 2:
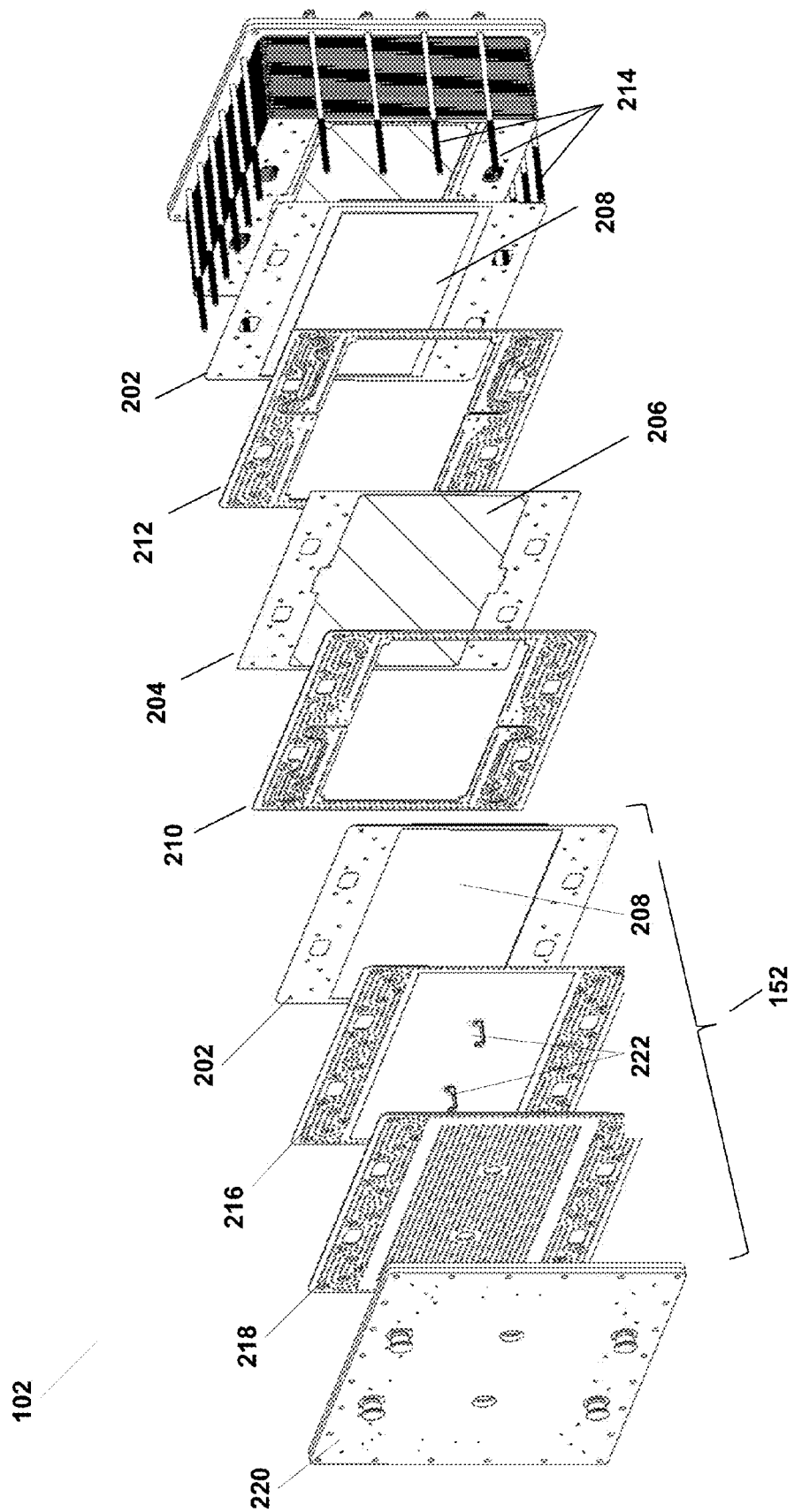
FIG. 2 illustrates an example of a stack.

FIG. 2 illustrates an example of stack 102 such as that described in U.S. application Ser. No. 12/577,134 and U.S. application Ser. No. 13/350,424, each of which is herein incorporated by reference in its entirety. As shown in FIG. 2, stack 102 is essentially constructed from electrode elements 202, membrane elements 204, and gaskets 210 and 212. As illustrated in FIG. 2, electrode elements 202 include a frame on which an electrode material 208 is attached. Membrane elements 204 include a frame on which the membrane 206 is attached. Gaskets 210 and 212 create electrolyte fluid flows between membranes 206 and electrodes 208. As is illustrated, gaskets 210 and 212 may be identically constructed, but rotated by 180 degrees. There are passages formed such that the two electrolytes can be separately directed into the appropriate flow fields between elements.

FIG. 2 further illustrates an example of terminal 152 that has been used in some systems. Terminal 152 includes an electrode 208, which in this configuration can be a charge collector. Components 216 and 218 are sandwiched between electrode 208 and end plate 220. Components 216 and 218 may be insulating seals. End plate 220 may be an aluminum end plate. Electrodes 222 may make contact with electrode 208 and extend from end plate 220. Stack 102 is held together and tensioned by bolts 214.

As is illustrated in FIG. 2, there are a large number of components that are included in stack 102. Each of these components provides opportunity for leakage to develop, degrading the efficiency of stack 102. Embodiments of the present invention can reduce the number of components in the stack.

In particular, some embodiments of the present invention include a single flow-field plate per individual cell in the stack. In some embodiments, a flow-field plate is machinable and moldable. Some embodiments of the present invention include a flow channel on both sides of the flow field plate. Such a construction can provide for a continuous seal path on either side of the plate. It also provides for a construction where the electrolyte flow does not go over a seam in the assembly (e.g., seams between the graphite plate, the flow field, and the membrane). The connecting path that provides a fluid flow channel that transitions between one side of the flow field plate and the other can be a hole through the flow field plate. Further, some embodiments can be provided with a large thick gasket that facilitates sealing of the channels. Such a gasket can also provide a barrier between channels on adjacent plates. Such gaskets can be compressible and compliant so that it seals at "pinch points" or "pressure ridges" formed from the continuous surrounding seals that surround each flow channel and the cell area.

A large gasket can have adequate cut-outs to reduce material volume and improve compressibility. Further, some embodiments of the flow field plate can have matching bosses to fill in the cut-outs where necessary. For example, the cut-outs can exist over the channels. The plate material can "fill-in" these areas so that flow is smooth. Further, gasket cut-outs and matching plate bosses also can be aligning features to aid in assembly.

Additionally, a flow-field plate according to some embodiments can include recesses to accommodate a large gasket, a membrane, and a bipolar plate. The recess depth can be tailored to ensure the proper compression of each material. Further, the compression of materials will not exceed the "hard stop" provided by the bosses in the flow-field plate, which can reduce the amount of compression inconsistency experienced in stack construction.

Sealing ridges can be provided at the edge of the membrane and graphite bipolar plate. Such ridges, provided by a seal, provide increased pressure at the edge. The membrane is compressible, so there is increased pressure or compression at the edge. This also improves the edge seal on the porous membrane by decreasing the porosity of the membrane through compression. A softer bipolar plate can also compress at the ridge. If a more rigid bipolar plate is used, then an o-ring seal can replace the ridge at this point. In addition to this, a thru-hole in the bipolar and flow field plate can be sealed with a plastic or rubber grommet to connect both rigid materials and provide a sealed flow path.

Figure 3:
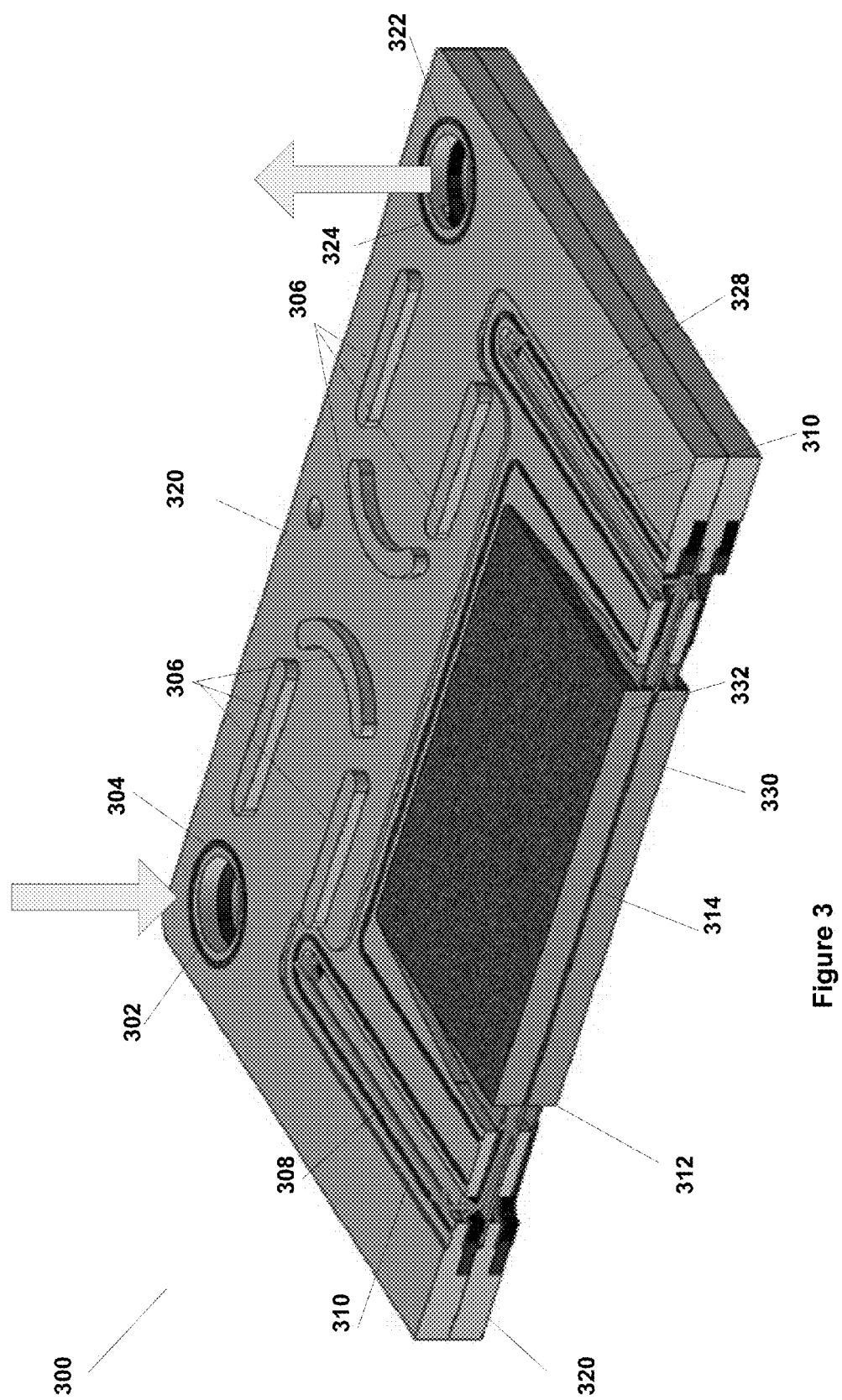
FIG. 3 illustrates an example of a single plate stack with two flow-field plates according to the present invention.

FIG. 3 illustrates a stacked assembly 300 with two flow-field plates 320 according to some embodiments of the present invention. As shown in FIG. 3, each flow-field plate 320 includes fluid ports 302 and 322. Each fluid port 302 is surrounded by seals 304 and 324, respectively. Seals 304 and 324 may be o-ring seals or they may be pressure seals. As shown in FIG. 3, input port 302 provides electrolyte fluid into flow-field plate 320 while exit port 322 directs fluid out of flow-field plate 320. Fluid is directed through channel 308, across flow field 312, through channel 328, and out fluid port 322. Carbon felt 332 is positioned in flow field 312. Carbon felt 330 is positioned in a similar flow field on the opposite side of flow-field plate 320. As is further shown in FIG. 3, bosses 306 provides for a hard stop alignment between adjacent ones of flow-field plates 320. A membrane may be shaped to cover carbon felt 332. As discussed further below, a bipolar plate 314 may separate carbon felt 332 and carbon felt 330.

Figure 4:
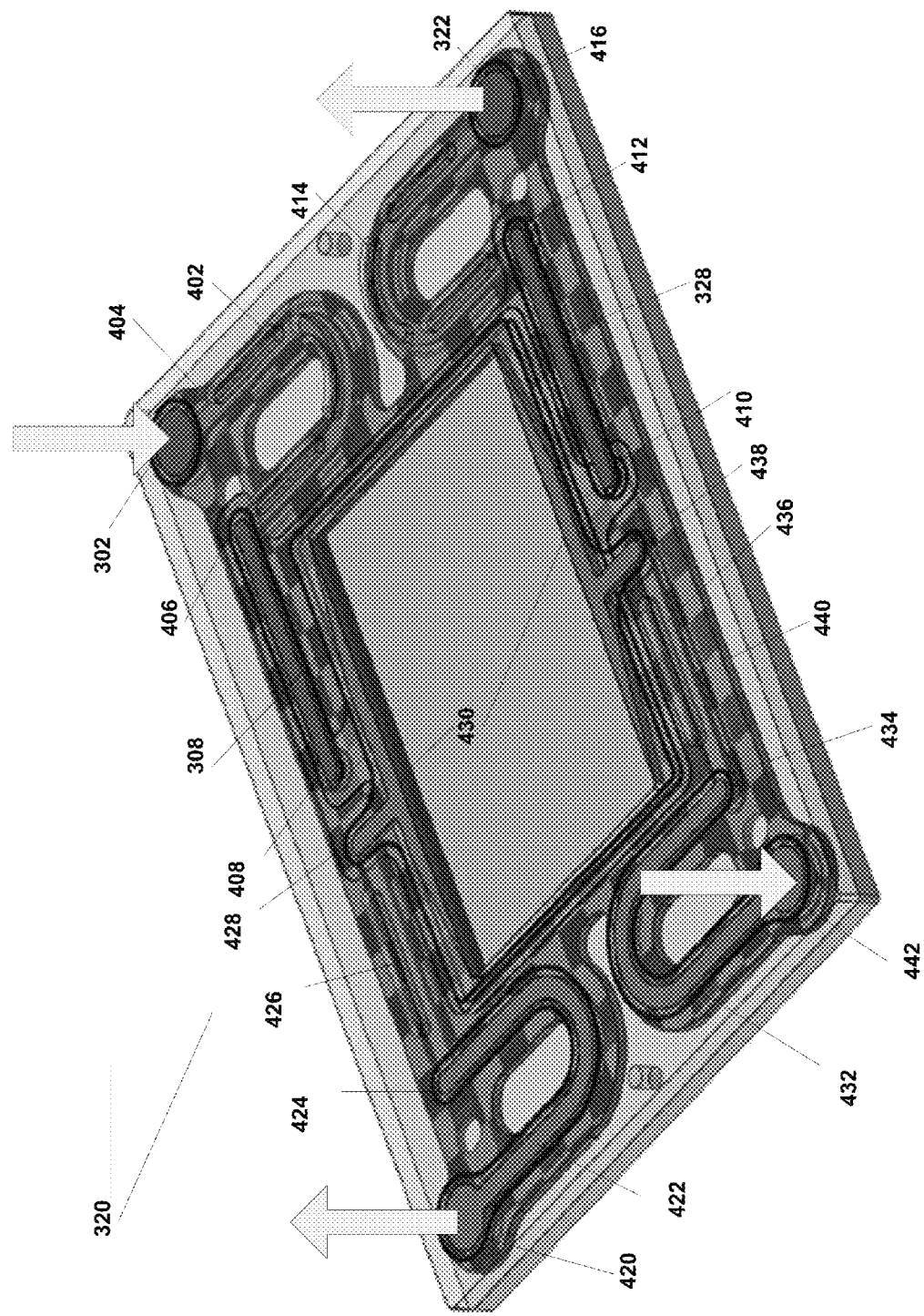
FIG. 4 illustrates the flow fields in a flow-field plate according to some embodiments of the present invention.

FIG. 4 illustrates electrolyte flows through an embodiment of flow-field plate 320 according to some embodiments of the present invention. As shown in FIG. 4, electrolyte through fluid port 302 is directed into channel 402 through feed-through 404. As shown in FIG. 4, electrolyte fluid is directed into port 302 through a first side of flow-field plate 320 while channel 402 is on a second side of flow-field plate 320 opposite the first side. Electrolyte in channel 402 is directed through feed-through 406 from the second side of flow-field plate 320 to the first side of flow-field plate 320. Electrolyte is then directed through channel 308 to feed through 408. Feed through 408 directs the electrolyte from the first side to the second side of field-flow plate 320 where it enters flow field 312 on the second side of flow-field plate 320. The electrolyte is directed from flow field 312 into feedthrough 410 where it is directed to channel 328 on the first side of flow-field plate 320. Electrolyte is then directed through feed-through 412 to channel 414 on the second side of flow-field plate 320. From channel 414 and through feed through 416 into port 322 where it exits flow-field plate 320.

A similar flow is directed for the opposite electrolyte through flow-field plate 320. Flow through port 420 directs electrolyte into channel 422 on the first side of flow-field plate 320. The second electrolyte is directed through feed-through 424 into channel 426 on the second side of flow-field plate 320. The electrolyte is then directed through feed-through 428 into flow field 430 that is on the first side of flow-field plate 320. Electrolyte is collected from flow field 430 and through feed-through 438 into channel 436 that is on the second side of flow-field plate 320. From channel 436, electrolyte is directed to channel 432 on the first side of flow-field plate 320 through feed-through 434. From channel 432, the electrolyte exits through port 442.

As is further shown in FIG. 4, a gasket 440 covers portions of the first side of flow-field plate 320. Gasket 440 can cover and seal individual channels 308, 402, 414, 328, 422, and 432. Further, gasket 440 can seal against ports 420, 442, 302, and 322. As discussed above, gasket 440 can be a thick gasket that is cut out for efficiency and seals between individual ones of flow-field plates 320.

Figure 5:
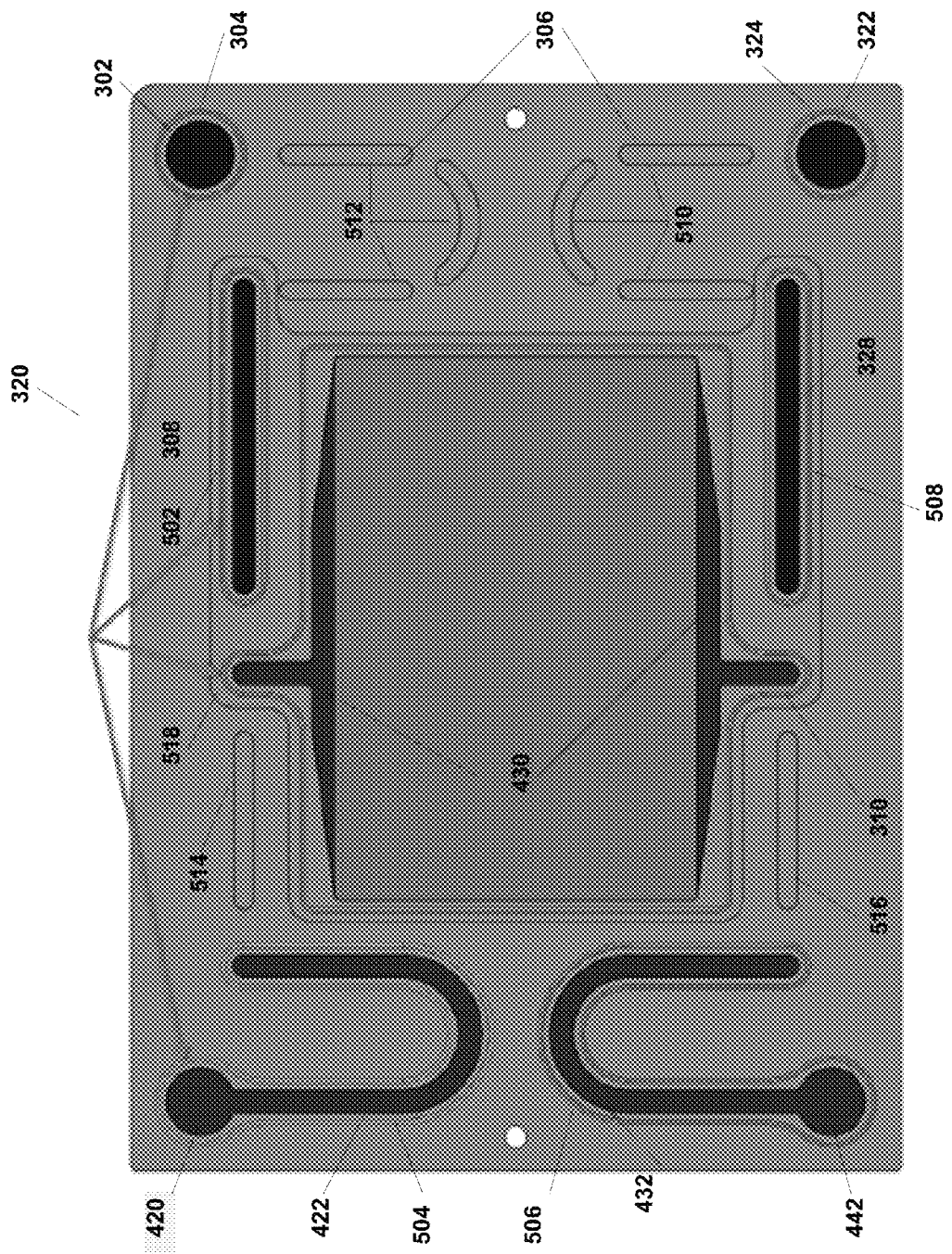
FIG. 5 illustrates a plan view of one side of a flow-field plate according to some embodiments of the present invention.

FIG. 5 provides a plan view of the first side of an example flow-field plate 320. As shown in FIG. 5, channels 308, 328, 422 and 432 are formed in the first side of flow-field plate 320. Ports 302, 322, 442 and 420 are formed into flow-field plate 320 from the first side of flow-field plate 320. Bosses 510, 512, 514, and 516 protrude from the first surface of flow-field plate 320. Boss 510 is formed in channel 414 while boss 512 is formed in channel 402. Further, boss 514 is formed in channel 426 and boss 516 is formed in channel 436.

FIG. 5 also illustrates that each fluid channel and access port is completely surrounded by a single seal. In that fashion, the flow channels can be effectively sealed by a membrane, a bipolar plate, or a gasket that engages the single seal that completely surrounds the fluid channel. As shown in FIG. 5, flow field 430 is completely surrounded by a gasket 310. Further, channel 308 is completely surrounded by gasket 502 and channel 328 is surrounded by gasket 508. Further, as is illustrated in FIG. 5, a depression 518 in the surface of flow-field plate 320 in which gaskets 502, 508, and 310 as well as flow field 430 and channels 308 and 328 are formed provides guidance in which a membrane or a bipolar plate can be inserted to seal against gaskets 502, 508, and 310. Additionally, port 420 and channel 422 can be completely surrounded by gasket 504, port 442 and channel 432 can be completely surrounded by gasket 506, port 302 is completely surrounded by gasket 304, and port 322 can be completely surrounded by gasket 324. A plate gasket 440 as shown in FIG. 4 can seal against seals 504, 506, 304, and 324.

Figure 6:
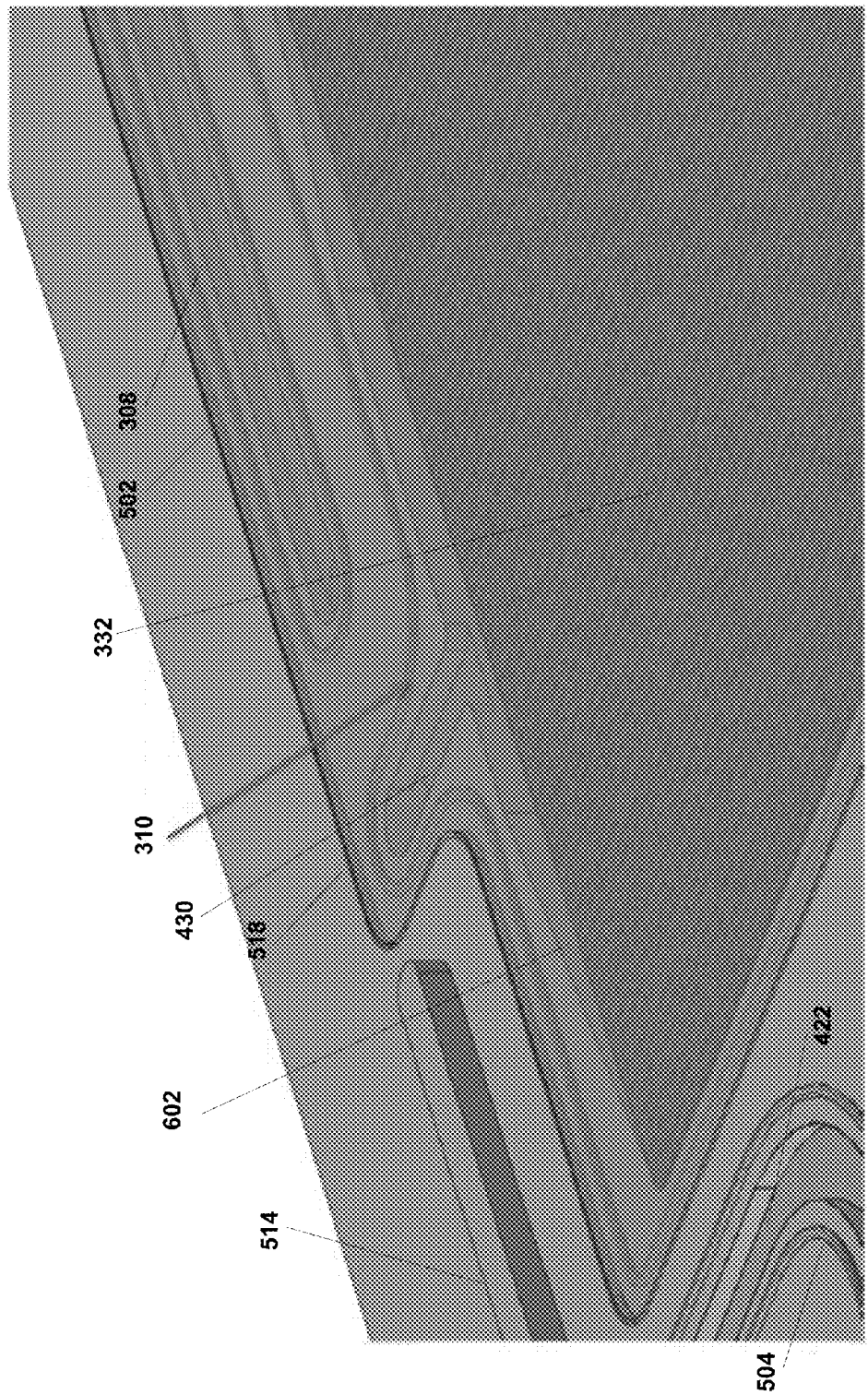
FIG. 6 illustrates a membrane inserted with a flow-field plate according to some embodiments of the present invention.

FIG. 6 illustrates a membrane 602 formed to fit within depression 518 so as to seal against the seals 310 and 502. Seals 310 and 502 can form a ridge against which the material of membrane 602 can seal. FIG. 6 also illustrates the carbon fiber 332 beneath membrane 602.

FIGS. 7A and 7B illustrate a plate 704, which may be bipolar plate or a membrane, positioned on the second side of flow-field plate 320. As shown in FIG. 7A, plate 704 is shaped to fit into depression 710 of flow-field plate 320. Further, a hole 706 through plate 704 allows electrolyte into flow field 312 through carbon felt 440. As is further illustrated in FIGS. 7A and 7B, bipolar plate 704 is sealed against flow-field plate 320 so that electrolyte can only flow through flow field 312 and does not contaminate flow field 430 through carbon felt 332. As illustrated in further detail in FIG. 7B, sealing ridges 708 and 714 are provided to seal bipolar plate 704 against flow-field plate 320.

As is further illustrated in FIG. 7A, a boss 702 formed in the bottom of flow channel 308 is formed. Further, some embodiments may include a depression 712 in which a sealing gasket can be inserted to seal against channel 402 and other channels.

Figure 7C:
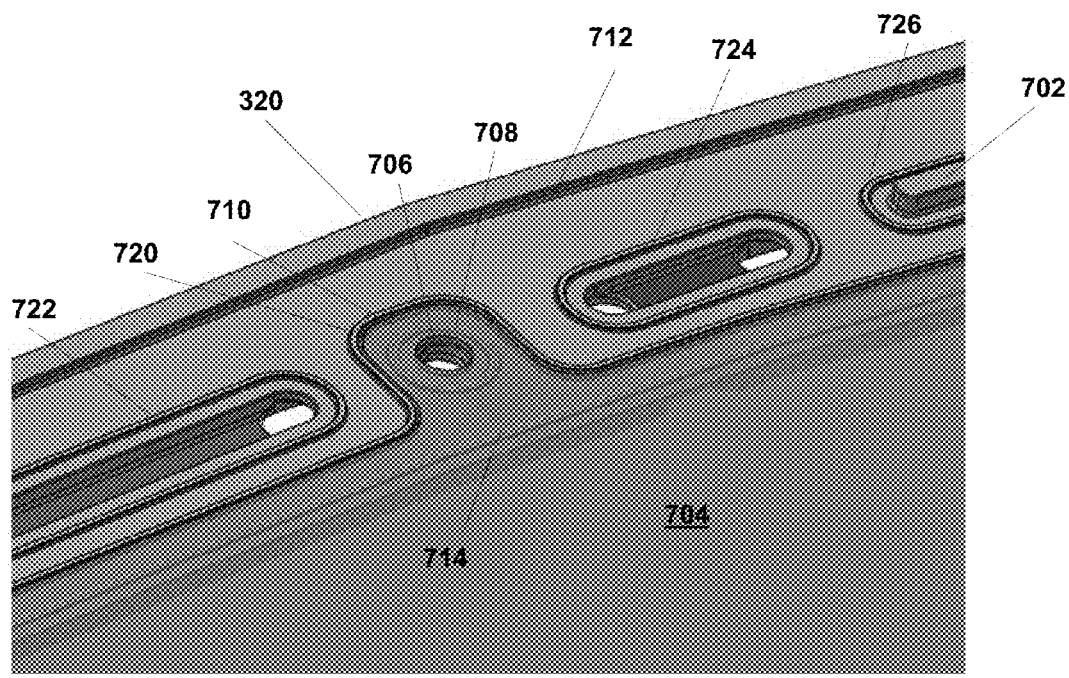
FIGS. 7C, 7D, and 7E further illustrate sealing of the flow-field plate with a plate inserted.
Figure 7D:
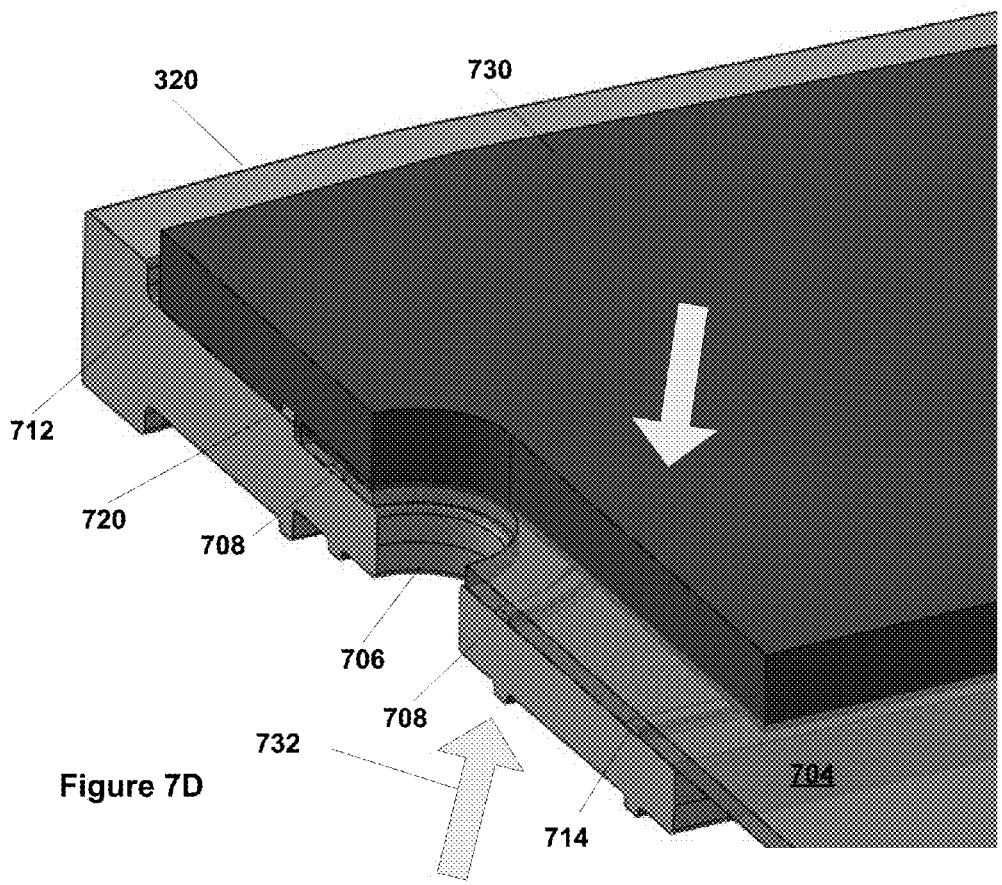

FIGS. 7C and 7D further illustrate the sealing of, for example, a plate 704 onto flow-field plate 320. It should be understood that plate 704 may be a bipolar plate or a membrane. As shown in FIG. 7C, plate 704 engages with seal ridges 708 and 714 to seal fluid coming through hole 706. FIG. 7C also illustrates sealing ridges 720, 722, 724, and 726. Sealing ridge 720 surrounds depression 710. Sealing ridges 722 and 724 surround channels. Sealing ridge 726 surround a boss 702.

FIG. 7D illustrates a cross section through hole 706. FIG. 7D illustrates plate 704 in contact with sealing ridges 708 and 714. FIG. 7D further illustrates gasket 730 placed in depression 712 over plate 704. Gasket 730, which may be gasket 440 as shown in FIG. 4, engages sealing ridge 720 and other sealing ridges. As is further illustrated in FIG. 7D, the stack components are compressed so that flow-field plate 320, plate 704, and gasket 730 are under pressure 732. Pressure 732 causes gasket 730 to seal against sealing ridge 730 and causes plate 704 to seal against sealing ridges 708 and 714.

Figure 7E:
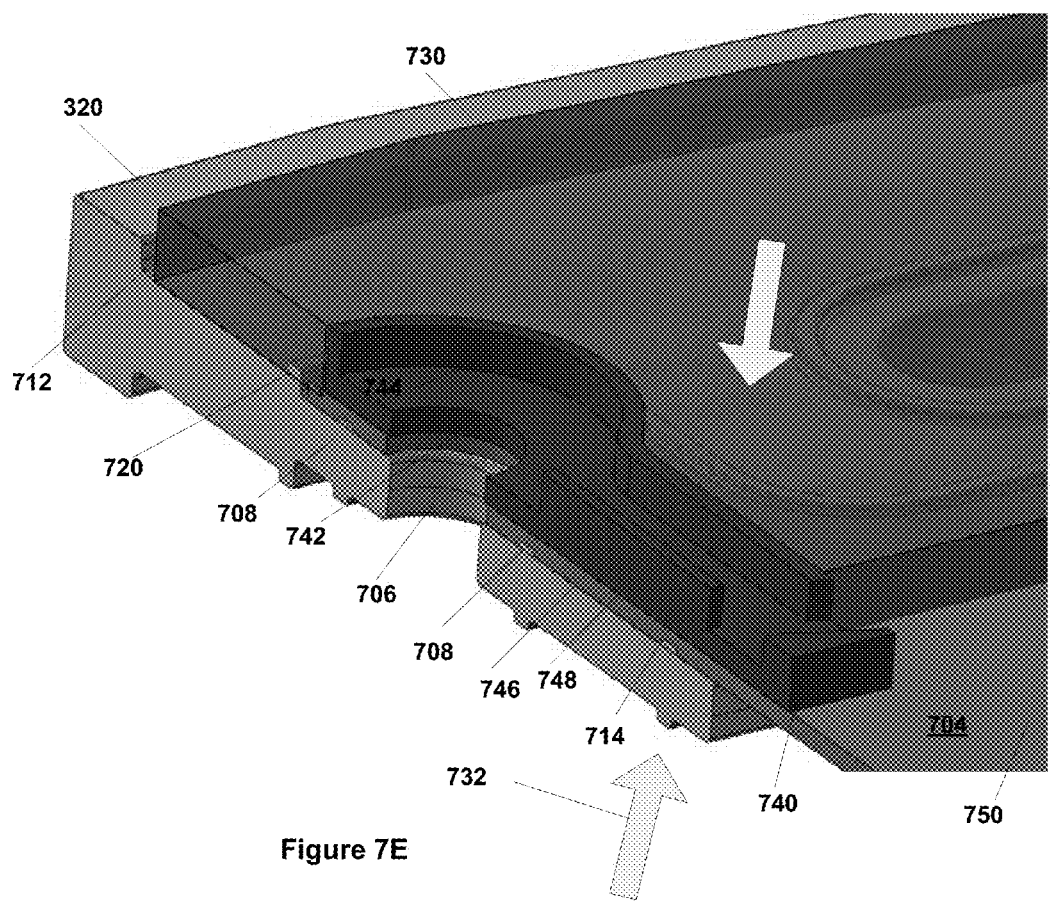

FIG. 7E illustrates a cross-section of a fluid directing insert 740. As shown in FIG. 7E, fluid directing insert 740 can be placed on plate 704 over hole 706 and directs fluid flow from hole 706 into a flow-field 750, which may be flow field 430 as shown in FIG. 4. As discussed previously, a carbon felt can be inserted into flow field 750. As is further shown in FIG. 4, insert 740 can include a hole 742 that aligns with hole 706 and a side-wall 744. A center wall 746 can form a fluid channel 748 to direct fluid in a particular direction into flow-field 750. Insert 740 is placed over hole 706 and gasket 730 is arranged to surround and hold insert 740 in place. The height of wall 744 can be arranged to substantially correspond with the compressed thickness of gasket 730.

Figure 8A:
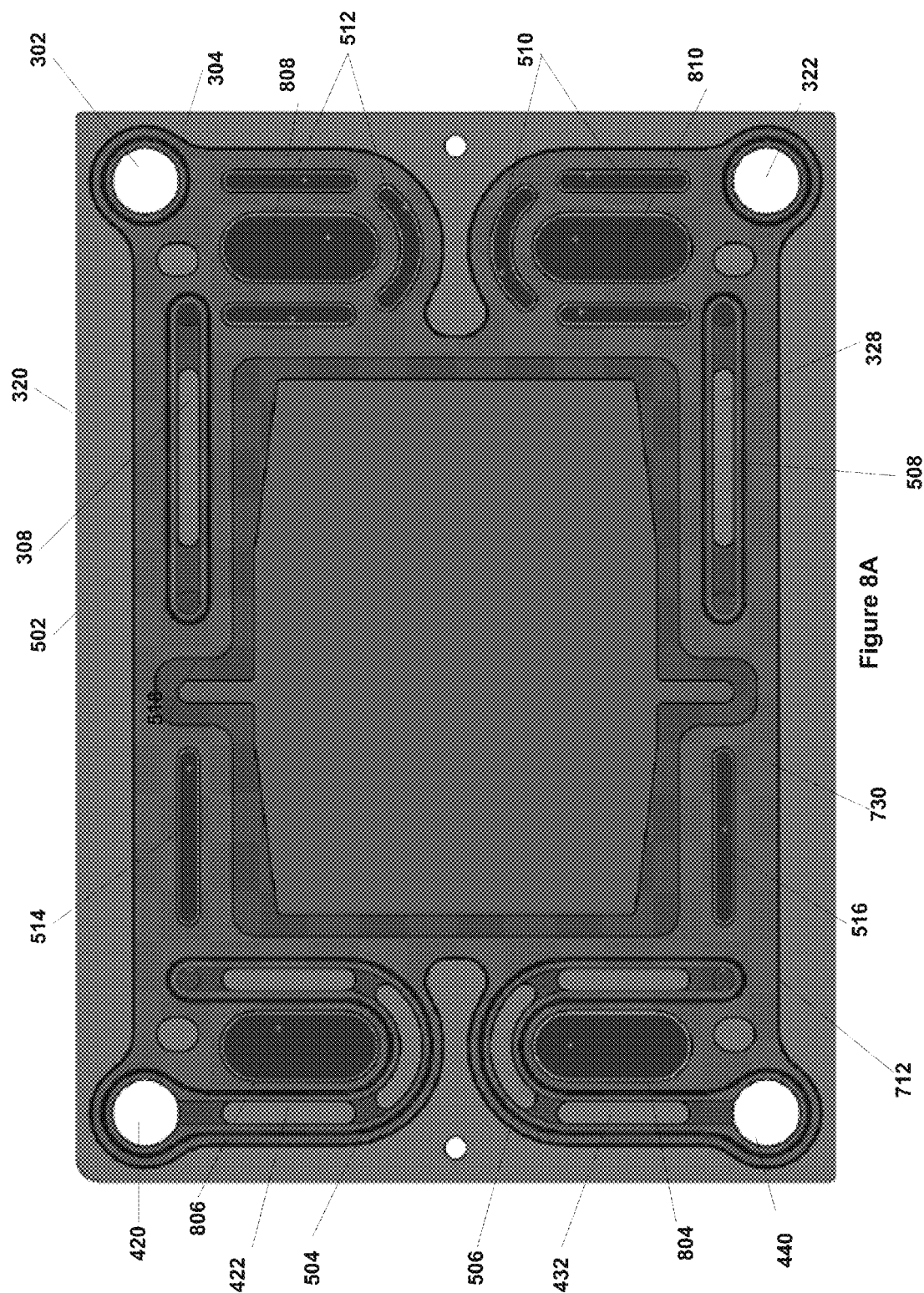
FIGS. 8A, 8B, and 8C illustrate a thick gasket and boss locations of a flow-field plate according to some embodiments of the present invention.
Figure 8B:
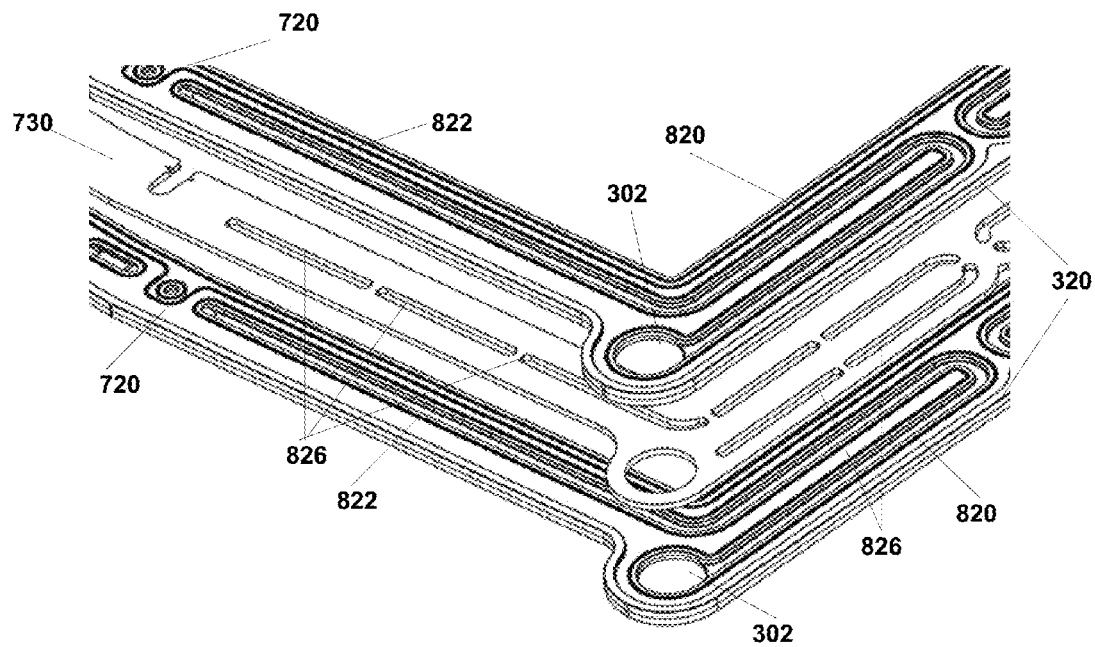
Figure 8C:
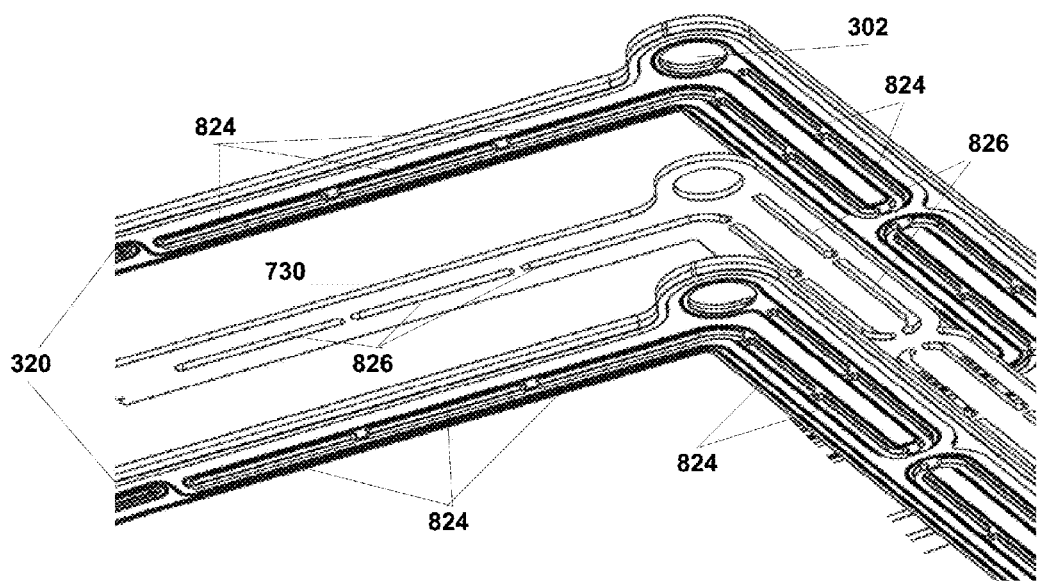

FIG. 8A illustrates another example of bosses in the first side of an embodiment of flow-field plate 320. As is further shown in FIG. 8, gasket 730 is inserted into depression 712 formed in the first surface of flow-field plate 320. Further, additional bosses 804, 806, 808, and 810 are formed in the first surface of flow-field plate 320. Flow-field plate 320 is similarly formed on the second surface of flow-field plate 320. The bosses can be aligned with an accompanying slot in gasket 730. As gasket 730 is compressed, gasket 730 presses into a gap between the boss and gasket 730 so as to seal against the boss. An appropriate offset between the boss and gasket can be used to account for the expansion of gasket 730 during compression. FIGS. 8B and 8C illustrates an example of fitting a gasket 730 for receipt of bosses and sealing of channels. The embodiment of flow-field plate 320 includes channel 820 from port 302. The channels in the example of flow-field plate 320 illustrated in FIGS. 8B and 8C show an alternative pattern of channels from that illustrated in FIG. 8A. As shown in FIG. 8B, gasket 730 is sandwiched between two plates 320 so that seal 822, which surrounds port 302 and channel 820, is sealed against gasket 730. FIG. 8B illustrates the other side of plates 320 and illustrates bosses 824. Bosses 824, as discussed previously, are formed in channels 820. As is further shown in FIGS. 8A and 8B, gasket 730 includes cut-out slots 826 that mate with bosses 824. As discussed above, cut-outs 826 may be large enough so that, when pressure is applied between plates 320 such that gasket 730 is compressed, gasket 730 also seals against bosses 826. In that fashion, bosses 826 can form a ceiling over channel 820.

Figure 9:
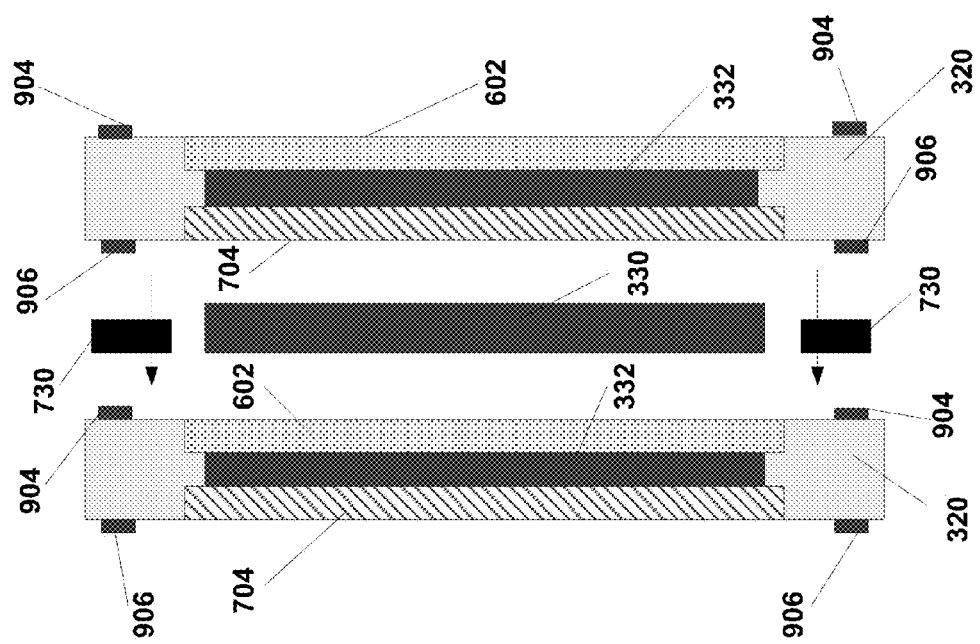
FIG. 9 illustrates construction of a stack with flow-field plates according to some embodiments of the present invention.

FIG. 9 illustrates a flow cell stack according to some embodiments of the present invention. As shown in FIG. 9, each flow-field plate 320 includes bosses 904 and 906, as discussed above. Further, a porous membrane 602 is inserted on the first side of flow-field plate 320 and a bipolar plate 704 is inserted on the second side of flow field plate 320. Carbon felt 332 is inserted between porous membrane 602 and bipolar plate 704. The two flow-field plates 320 shown in FIG. 9 are compressed together with a gasket 730 and carbon felt 330 between. As discussed above, gasket 730 is fitted around bosses 904 and 906.

Figure 10:
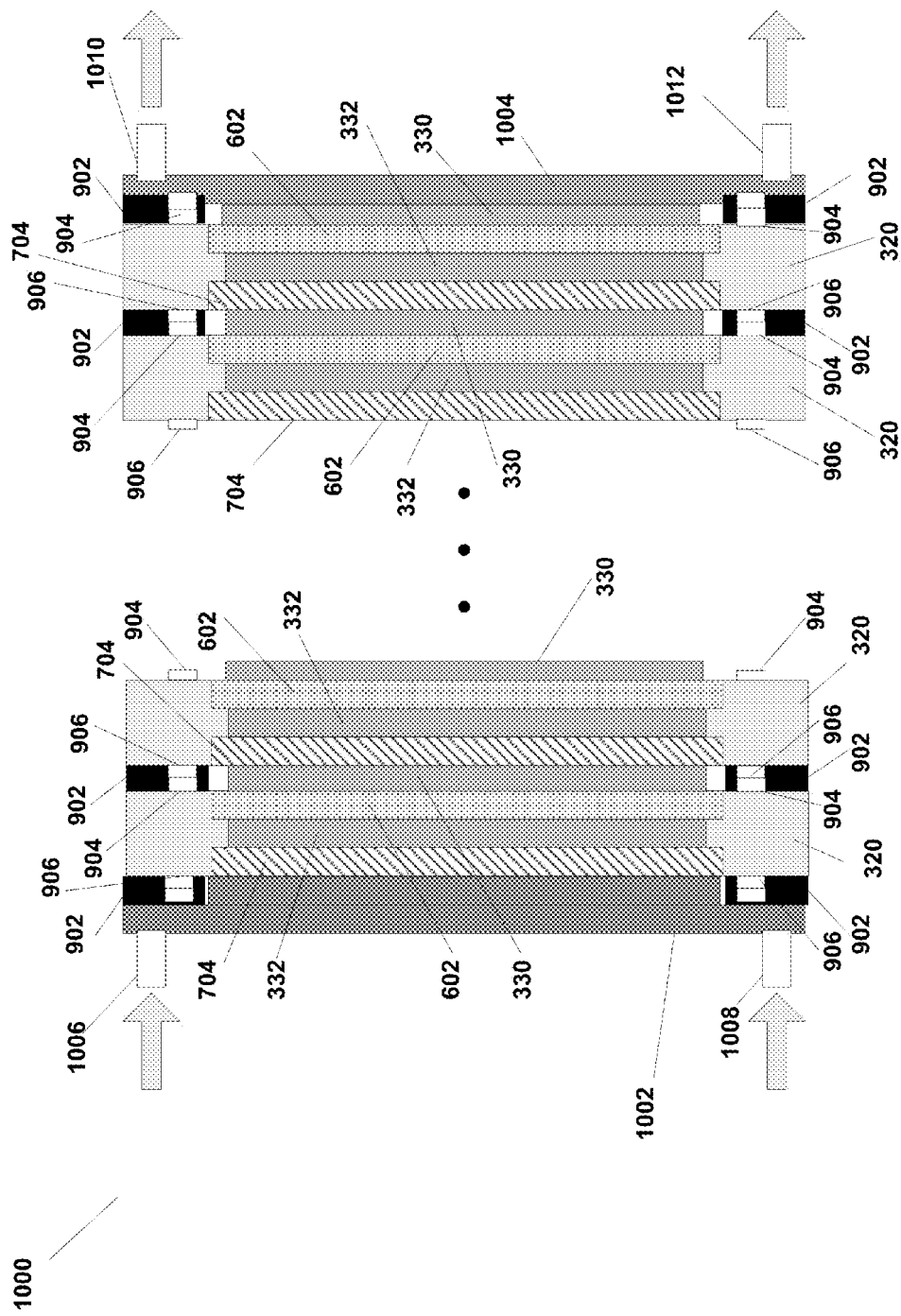
FIG. 10 illustrates a stack with flow-field plates according to some embodiments of the present invention.

FIG. 10 illustrates a stack 1000 formed with flow-field plates 320. As shown in FIG. 10, a first end electrode 1002 is formed to contact bipolar plate 704 that is inserted into a first flow-field plate 320. In some embodiments, first end electrode 1002 can replace bipolar plate 704 and be formed to attach to the second side of the first flow-field plate 320. Further, bipolar plates 704, carbon felts 330 and 332, membranes 602, and gaskets 902 are assembled with flow-field plates 320 as discussed above. A second end electrode 1004, which is the end electrode or current collector and may correspond with a battery terminal, interfaces with the last flow-field plate 320 so that the last cell is formed. As is further illustrated in FIG. 10, first end electrode 1002 can include ports 1006 and 1008 which receive the catholyte and anolyte electrolytes and direct the fluids into the stack. Further, second end electrode 1004 includes ports 1010 and 1012 that ejects the catholyte and anolyte electrolytes that have flowed through stack 1000 as described above.

Figure 11:
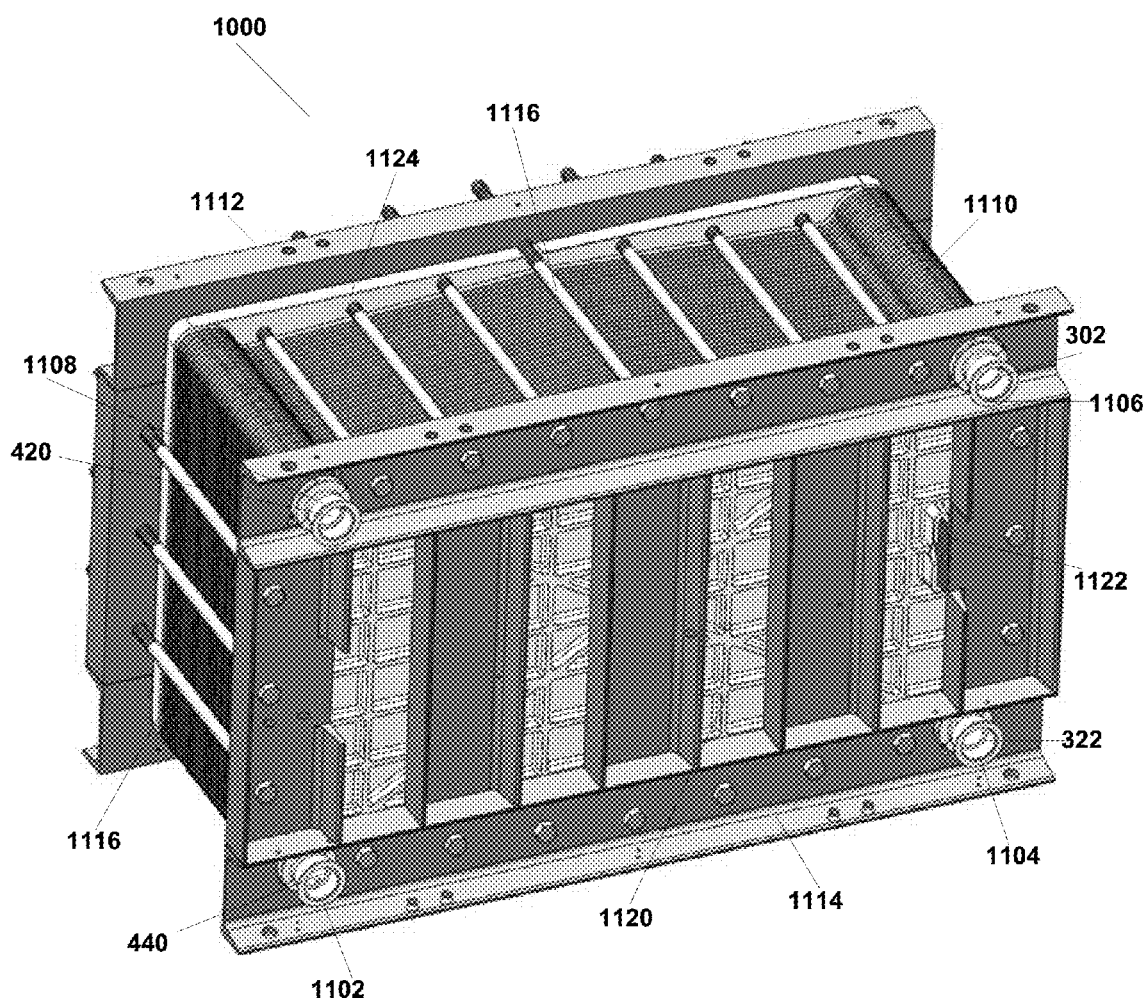
FIG. 11 illustrates an assembled stack according to some embodiments of the present invention.

FIG. 11 illustrates an assembled stack 1000 according to some embodiments of the present invention. As shown in FIG. 11, a stack 1110 such as that discussed above is positioned between end plate 1124 and end plate 1120 and compressed between frame 1112 and frame 1114. Frame 1112 and 1114 are connected with an array of bolts 1116 arranged around the periphery of frames 1112 and 1114 so as to compress and secure stack 1110. As shown in FIG. 11, some of bolts 1116 may extend through end plates 1124 and 1120. As is further shown in FIG. 11, frames 1112 and 1114 can also provide mounting for assembled stack 1000 into a flow cell system such as system 100 illustrated in FIG. 1.

As shown in FIG. 11, electrolyte ports 420, 440, 302 and 322 may extend through frame 1114. There may be no access to ports 420, 440, 302 and 322 through frame 1112. In practice, ports 440 and 322 may be electrolyte ingress ports while ports 420 and 302 may be electrolyte egress ports. Plumbing connectors 1102, 1104, 1106, and 1108 allow for connection of tubing for the flow of electrolyte through ports 440, 322, 302, and 420, respectively.

As is further illustrated in FIG. 11, electrode 1122 is extended through end plate 1120. An electrical connection to stack 1110 in assembled stack 1000 can be made between electrode 1122 and a similar electrode extending from end plate 1124.

Figure 12A:
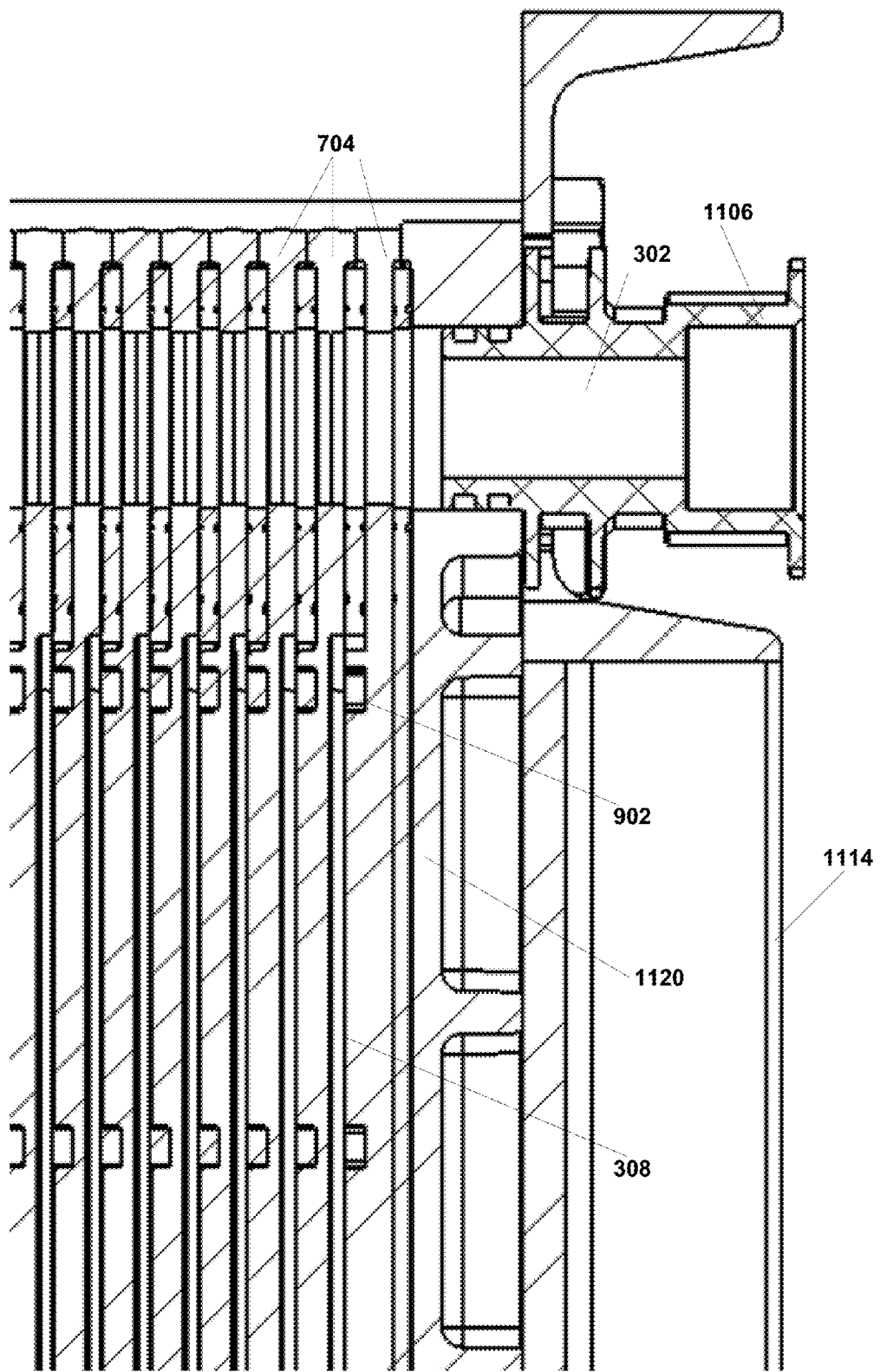
FIGS. 12A and 12B illustrate cross sections of a stack with flow-field plates according to some embodiments of the present invention.
Figure 12B:
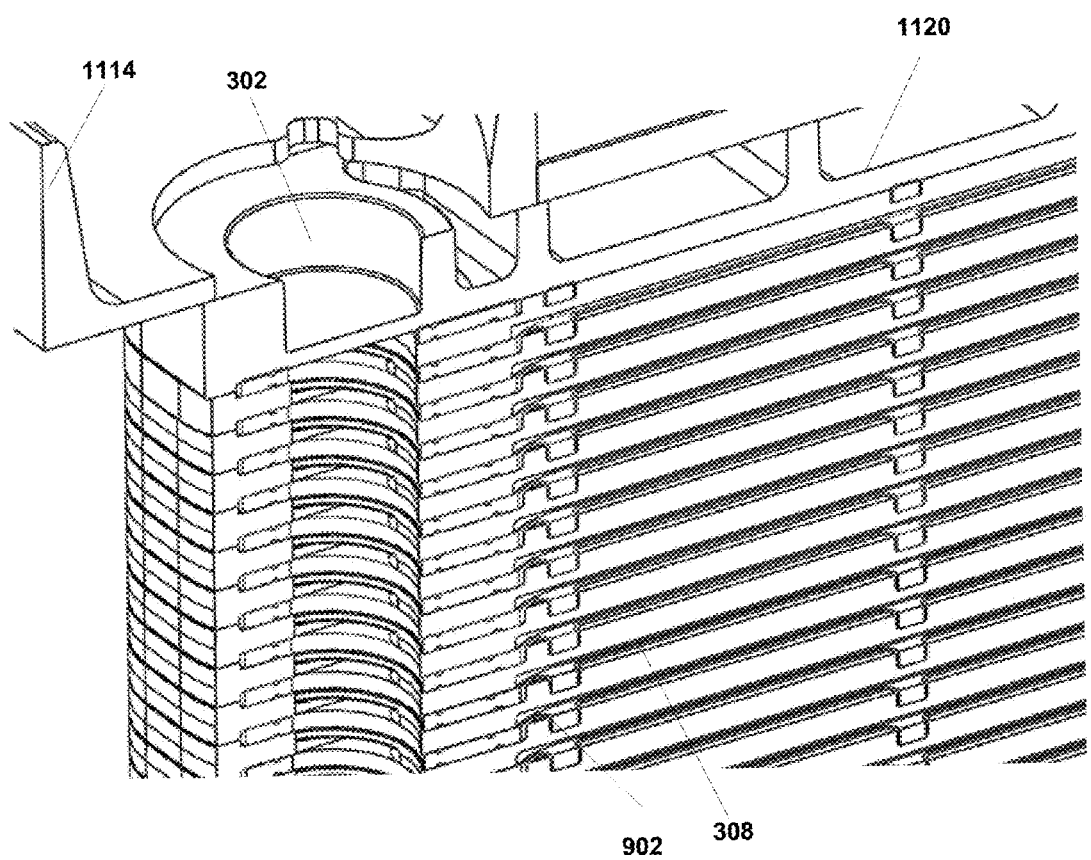

FIGS. 12A and 12B depict cross-sections of the stack 1110 as illustrated in FIG. 10. Relationships between flow plate 704, gasket 904 and a channel 308 are illustrated.

Figure 13:
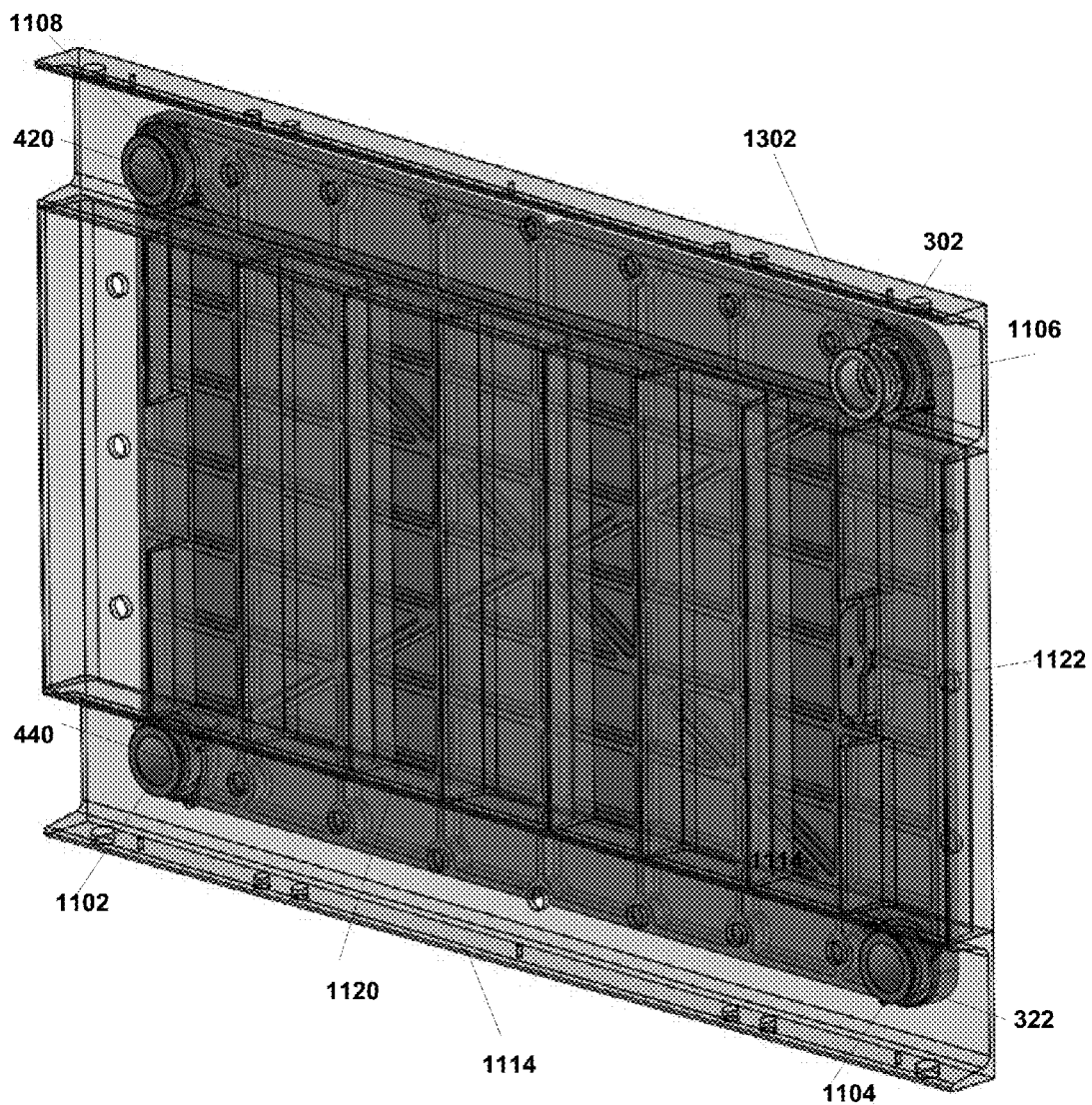
FIG. 13 further illustrates an end plate of an assembled stack as shown in FIG. 11.

FIG. 13 illustrates an end plate 1120 mounted to frame 1114. As shown in FIG. 13, a plumbing fitting 1302 can be clipped onto plumbing connector 1106 on end plate 1120. Plumbing fittings can be clipped onto all of plumbing connectors 1102, 1104, 1106, and 1108.

Figure 14A:
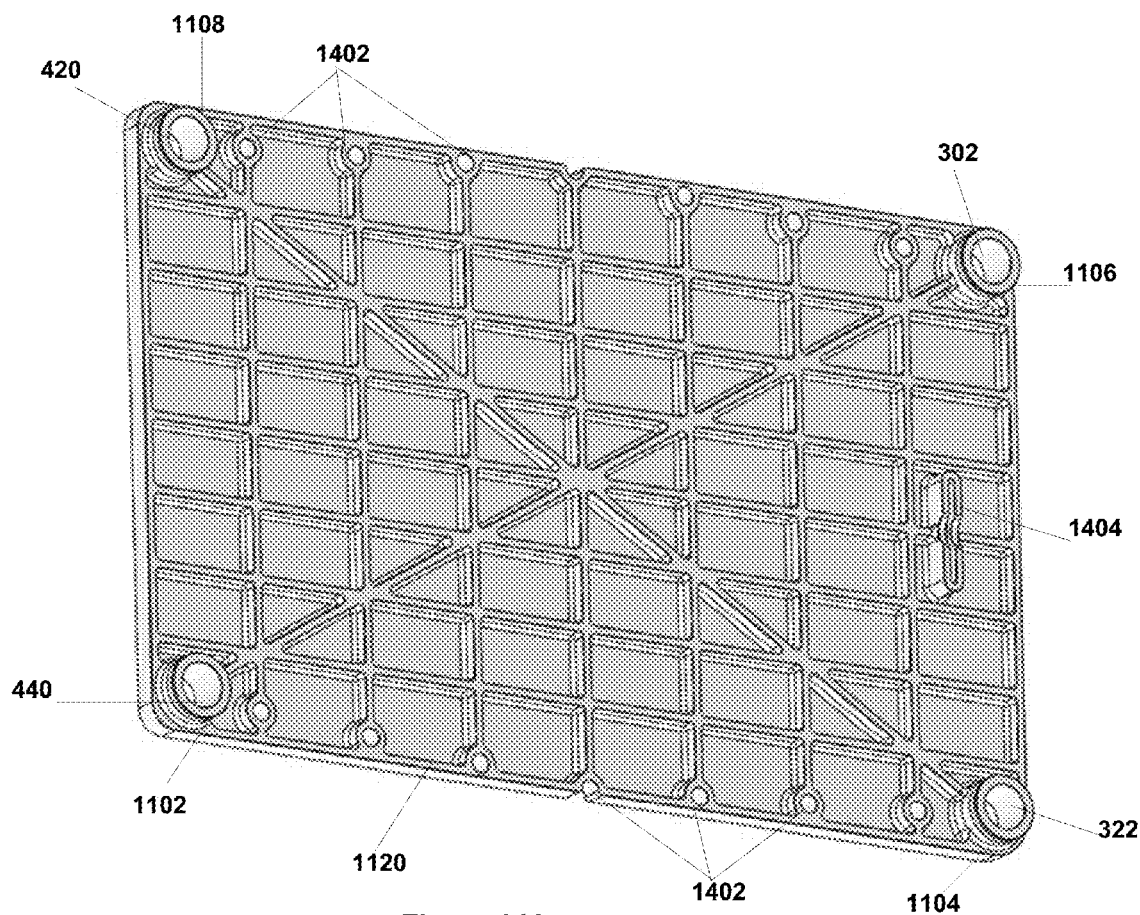
FIGS. 14A and 14B illustrate a structural end component of the assembled stack according to some embodiments of the present invention.
Figure 14B:
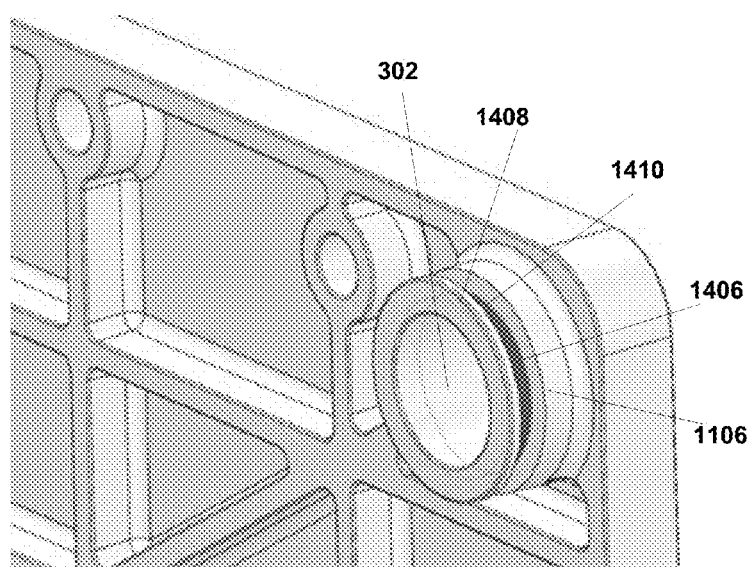

FIGS. 14A and 14B illustrate an example of end plate 1120. As shown in FIG. 14A, end plate 1120 can be formed of as a hollowed-out structure amenable to injection molding or structural foam molding. As shown in FIG. 14A, alignment holes 1402 can be formed on the outside periphery of end plate 1120. Alignment holes allow through access for tensioning bolts 1116 and help to align stack 1110 with frames 1112 and 1114. End plate 1120 also includes a raised enclosure 1404 through which electrode 1122 can extend. Raised enclosure 1404 can provide a clipping feature for a connector that makes electrical contact with electrode 1122.

FIG. 14B illustrates plumbing connector 1106, which is representative of plumbing connectors 1102, 1104, 1106, and 1108. As shown in FIG. 14B, a lip 1408 and depression 1410 allow for a plumbing fitting 1302 to clip onto plumbing connector 1106. Further, in some embodiments an undercut 1406 can be machined into depression 1410 to engage plumbing fitting 1302.

Figure 15A:
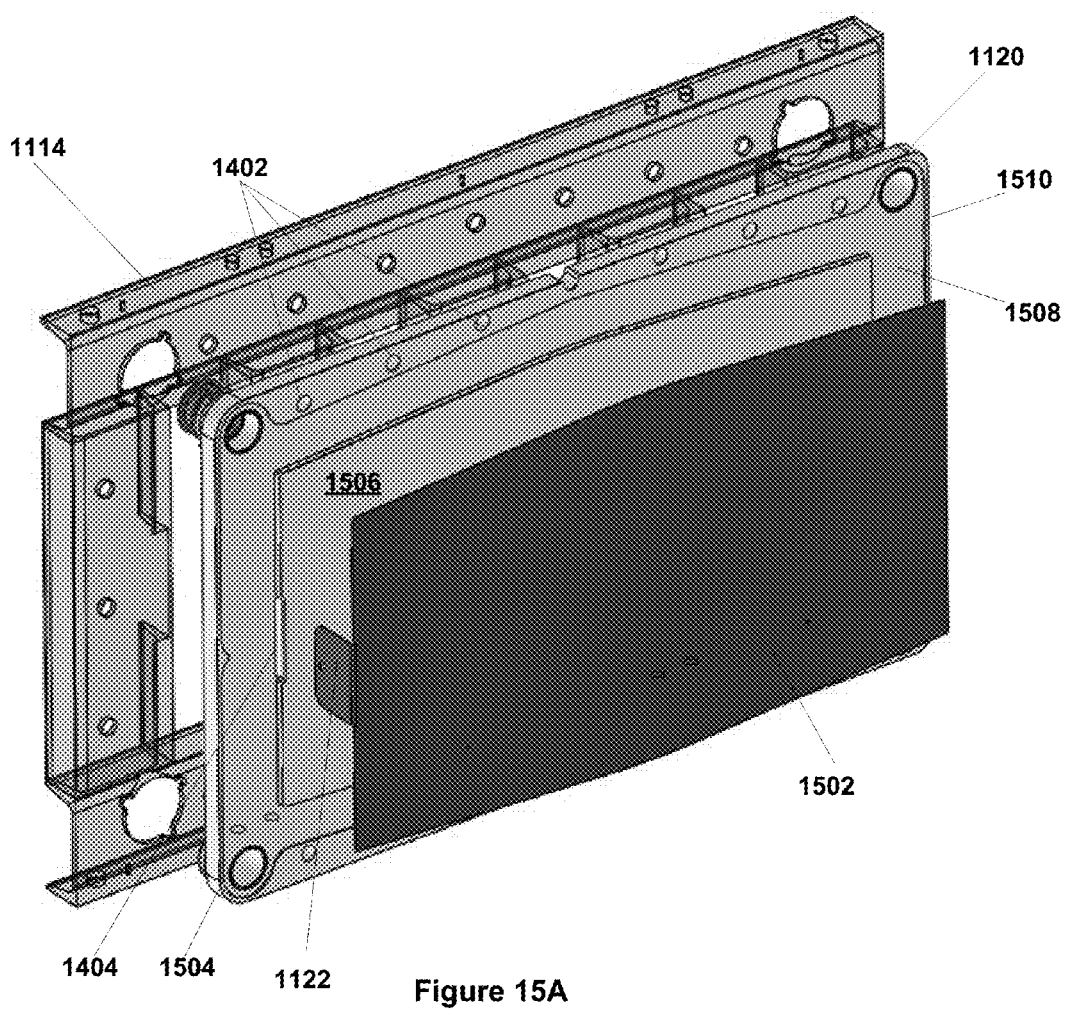
FIGS. 15A, 15B, 15C and 15D illustrate end plate construction of an assembled stack according to some embodiments of the present invention.

FIG. 15A illustrates the opposite side of end plate 1120 than that illustrated in FIG. 14A. As shown in FIG. 15A, end plate 1120 is mated to frame 1114 such that alignment holes 1402 are positioned to receive tensioning bolts 1116. A current collector plate 1502, which includes electrode tab 1122, is positioned such that electrode 1122 passes through raised enclosure 1404. As shown in FIG. 15A, collector plate 1502 mates with a raised platform 1506 formed in end plate 1120. Mounting collector plate 1502 on raised platform 1506 can help to ensure proper compression and electrical contact in stack 1110.

As is further illustrated in FIG. 15A, a depression 1508 is formed in end plate 1120 to receive a gasket. Seals 1504 engage with a gasket that fits into depression 1508 in order to seal around plumbing connectors 1102, 1104, 1106, and 1108.

Figure 15B:
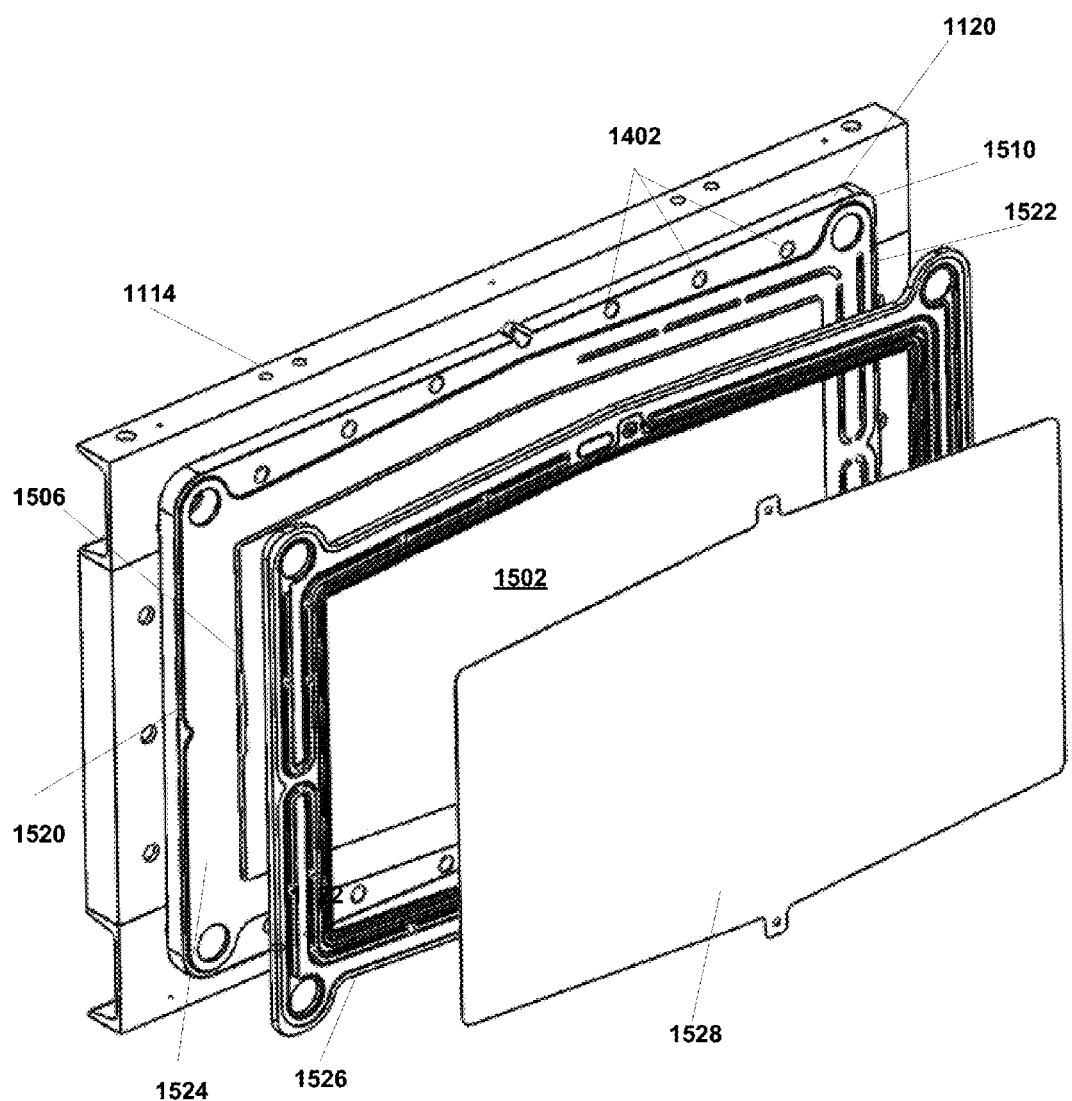

FIG. 15B further illustrates assembly of an end of stack system 1000. As shown in FIG. 15B, collector plate 1502 is on raised platform 1506. A gasket 1520 is mounted within depression 1508. An end flow-field plate 1526, which is a flow-field plate as discussed above, is inserted onto gasket 1520 such that current collector 1502, which resides on raised platform 1506, is pushed through flow-field plate 1526 to electronically engage with an end graphite bipolar plate 1528. As is shown in FIG. 15B, gasket 1520 includes a sealing portion 1524 that seals electrolyte flow in one side of flow-field plate 1526 and a blocking portion 1522 that seals flow in the other side of flow-field plate so that one side provides electrolyte flow to the end half-cell of stack 1110 while blocking flow in the other side.

Figure 15C:
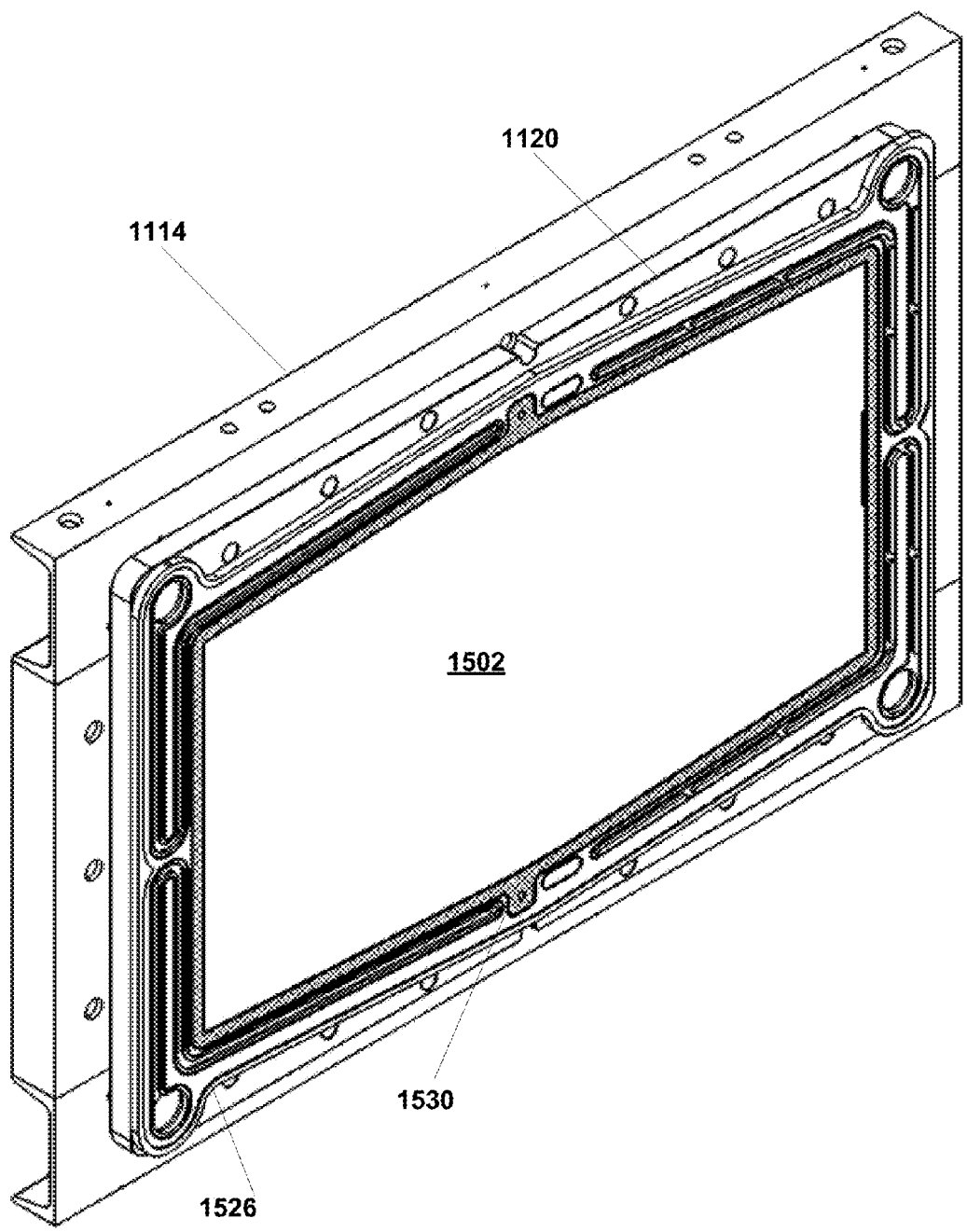

FIG. 15C illustrates an embodiment of an end of stack system 1000 where a thinner end gasket 1530 is placed between flow-field plate 1526 and bipolar plate 1528. End gasket 1530 can provide for a better seal between bipolar plate 1528 and flow-field plate 1526 while maintaining electrical contact between bipolar plate 1528 and current collector 1502.

Gasket 1530 can be a separate gasket that attaches to end flow-field plate 1526 by adhesive or press fit. End gasket 1530 can, for example, be an o-ring type seal. In some embodiments, end gasket 1530 can be overmolded to flow-field plate 1526 or have a press-in feature that holds it in place to flow-field plate 1526 during assembly. End gasket 1530 can be a compression seal and therefore the compression will hold end gasket 1530 in place during operation. End gasket 1530 can be, for example, an elastomer material such as SANTOPRENE™ or EPDM.

Figure 15D:
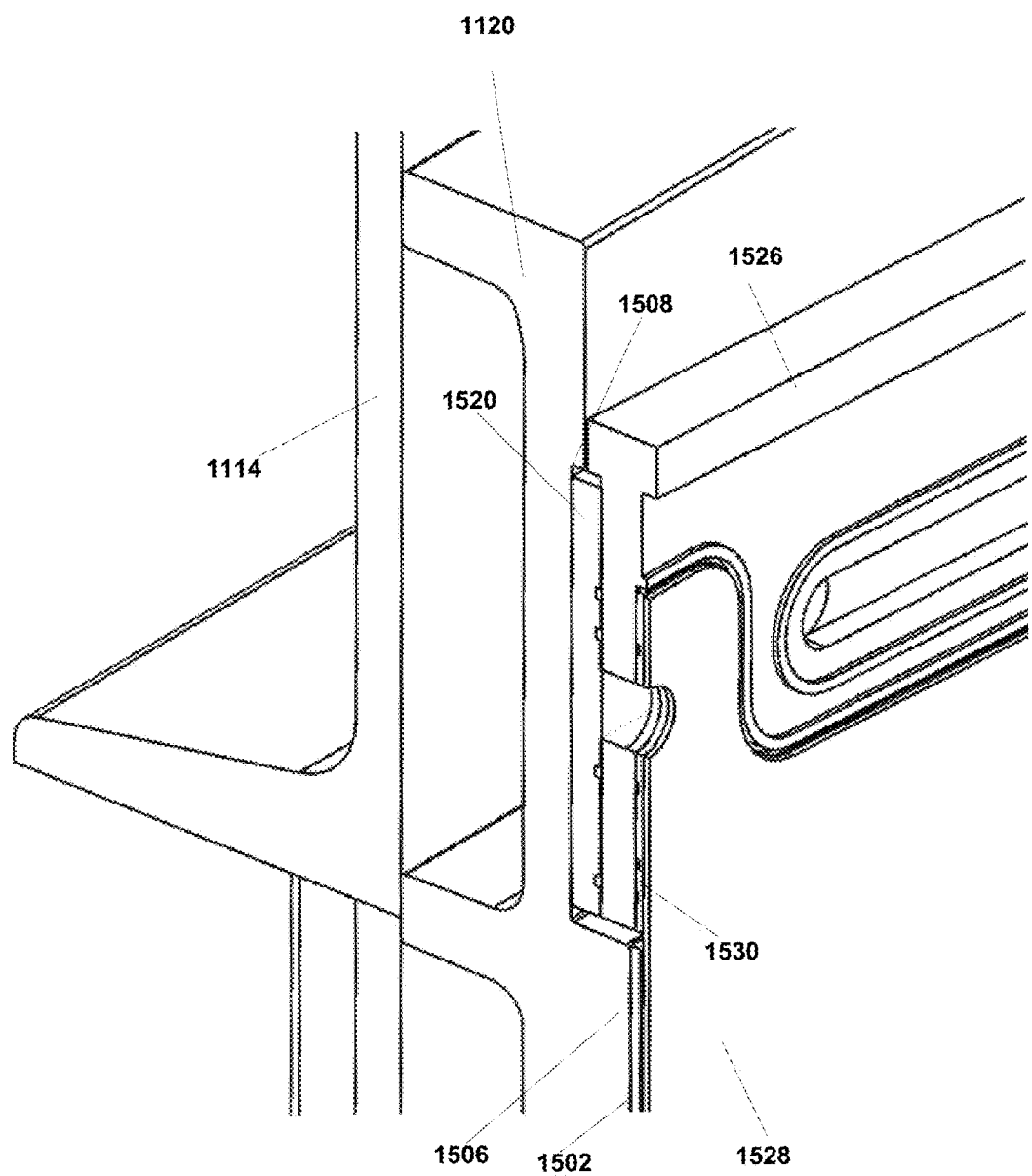

FIG. 15D shows a cross-section of the end portion of stack system 1000. As shown in FIG. 15D, end plate 1120 is mounted to compression frame 1114. Current collector 1502 is mounted on raised platform 1506 of end plate 1120, Gasket 1620 is mounted in depression 1508 of end plate 1120. Flow-field plate 1526 is mounted in contact with gasket 1520 while current collector 1502 is pushed through flow-field plate 1526. End gasket 1530 is mounted on flow-field plate 1526 and surrounds current collector 1502. Bipolar plate 1528 is then placed in contact with gasket 1530 and in electrical contact with current collector 1502.

Flow-field plates such as flow-field plates 320 can be formed, for example, from polypropylene, HDPE, LDPE, or PVC. Gaskets such as gaskets 902 can be formed, for example, from SANTOPRENE™ or EPDM. End plates, which may formed with end electrodes 1002 and 1004, can be made, for example, from polypropylene, HDPE, LDPE, or PVC. Press plates, which may also be formed with end electrodes 1002 and 1004, can be formed from, for example, aluminum or steel. Bipolar plate 704 can be formed, for example, from graphite composites, TF-6 (SGL Group), PV-10 (SGL Group), or TG746 (Graftech). Felt (electrode) such as carbon felts 330 and 332 can be formed, for example, from carbon felt or carbon paper. Possible suppliers for the carbon felt include Nippon, SGL Group, and Zoltek. Membranes such as membranes 602 can be formed, for example, from porous polyethylene separator (available from Daramic) or can be ion transfer membrane (NAFION™). A current collector can be formed with end electrodes 1002 and 1004 and can be formed, for example, from copper, titanium and stainless steel.

In the preceding specification, various embodiments have been described with reference to the accompanying drawings. It will, however, be evident that various modifications and changes may be made thereto, and additional embodiments may be implemented, without departing from the broader scope of the invention as set for in the claims that follow. The specification and drawings are accordingly to be regarded in an illustrative rather than restrictive sense.

What is claimed is:

1. A flow-field plate in a flow-cell stack structure, comprising:
   a molded plate having a first side and a second side;
   first electrolyte channels formed in the molded plate to direct a first electrolyte to a first flow-field on the first side of the molded plate; and
   second electrolyte channels formed in the molded plate to direct a second electrolyte to a second flow-field on the second side of the molded plate,
   wherein the first electrolyte channels include
   a first channel formed in the first side;
   a second channel formed in the second side, the second channel fluidically coupled to the first channel;

a first electrolyte flow-field ingress channel formed in the first side, the flow-field ingress channel fluidically coupled to the second channel;
a first electrolyte flow-field egress channel formed in the first side opposite the first electrolyte flow-field ingress channel;
a third channel formed in the second side, the third channel fluidically coupled to the flow-field egress channel; and
a fourth channel formed in the first side, the fourth channel fluidically coupled to the third channel.

2. The flow-field plate of claim 1, wherein the second electrolyte channels are opposite the first electrolyte channels and include
a fifth channel formed in the second side;
a sixth channel formed in the first side, the sixth channel fluidically coupled to the fifth channel;
a second electrolyte flow-field ingress channel formed in the second side, the second electrolyte flow-field ingress channel fluidically coupled to the sixth channel;
a second electrolyte flow-field egress channel formed in the second side opposite the second electrolyte flow-field ingress channel;
a seventh channel formed in the first side, the seventh channel fluidically coupled to the second electrolyte flow-field egress channel; and
an eighth channel formed in the second side, the eighth channel fluidically coupled to the seventh channel.

3. The flow-field plate of claim 2, wherein the first channel is fluidically coupled to receive the first electrolyte from a first electrolyte ingress port, the fourth channel is fluidically coupled to expel the first electrolyte to a first electrolyte egress port, the fifth channel is fluidically coupled to receive the second electrolyte from a second electrolyte ingress port, and the eight channel is fluidically coupled to expel the second electrolyte to a second electrolyte egress port.

4. The flow-field plate of claim 3, further including
a first seal formed around the first channel and the first electrolyte ingress port;
a second seal formed around the second channel;
a third seal formed around the third channel;
a fourth seal formed around the fourth channel and the first electrolyte egress port;
a fifth seal formed around the fifth channel and the second electrolyte ingress port;
a sixth seal formed around the sixth channel;
a seventh seal formed around the seventh channel; and
an eight seal formed around the eighth channel and the second electrolyte egress port.

5. The flow-field plate of claim 1, wherein the second electrolyte channels include a first channel in the first side fluidically coupled to a first electrolyte flow-field ingress on the second side, and a second channel in the first side fluidically coupled to a first electrolyte flow-field egress on the second side; and wherein the first electrolyte channels include a third channel in the second side fluidically coupled to a second electrolyte flow-field ingress on the first side, and a fourth channel in the second side fluidically coupled to a second electrolyte flow-field egress on the first side.

6. The flow-field plate of claim 1, wherein the first electrolyte channels and the second electrolyte channels are each sealed by seals formed around the first electrolyte channels and the second electrolyte channels.

7. The flow-field plate of claim 6, wherein the first electrolyte channels and the second electrolyte channels are formed in a first depression formed in the first side of the flow-field plate and a second depression formed in the second side of the flow-field plate, the depression formed to receive a gasket that seals against the seals.

8. The flow-field plate of claim 7, further including a third depression formed in the first depression to receive a plate.

9. The flow-field plate of claim 8, wherein the plate is a membrane or a bipolar electrode.

10. The flow-field plate of claim 1, further including bosses formed in each of the first electrolyte channels and the second electrolyte channels.

11. The flow-field plate of claim 10, wherein the bosses mate with first electrolyte channels and second electrolyte channels of adjacent flow-field plates.

12. A flow-field plate, comprising
a molded plate having a first side and a second side;
a first electrolyte flow structure formed in the molded plate directing a first electrolyte through first electrolyte channels formed in both the first side and the second side through a first side flow field;
a second electrolyte flow structure formed in the molded plate directing a second electrolyte through second electrolyte channels formed in both the second side and the first side through a second side flow field; and
sealing structures formed around the first electrolyte channels and the second electrolyte channels.

13. The flow-field plate of claim 12, further including a first depression formed in the first side that accommodates a component.

14. The flow field plate of claim 13 wherein the component is one of a membrane and a bipolar plate.

15. The flow field plate of claim 13 further including a second depression formed in the first side that accommodates a gasket that seals against the sealing structures.

16. A flow-stack, comprising:
a plurality of flow-field plates, each of the plurality of flow-field plates include a plate having a first side and a second side, first electrolyte channels formed in the plate to direct a first electrolyte to a first flow-field and second electrolyte channels formed in the plate to direct a second electrolyte to a second flow-field,
wherein the first electrolyte channels include
a first channel formed in the first side;
a second channel formed in the second side, the second channel fluidically coupled to the first channel;
a first electrolyte flow-field ingress channel formed in the first side, the flow-field ingress channel fluidically coupled to the second channel;
a first electrolyte flow-field egress channel formed in the first side opposite the first electrolyte flow-field ingress channel;
a third channel formed in the second side, the third channel fluidically coupled to the flow-field egress channel; and
a fourth channel formed in the first side, the fourth channel fluidically coupled to the third channel;
one or more membranes formed to fit within a depression in a corresponding one of the plurality of flow-field plates, each of the one or more membranes arranged such that the first flow field of one of the plurality of flow-field plates direct the first electrolyte across a first surface of membrane and the second flow field of an adjacent one of the plurality of flow-field plates directs the second electrolyte across a second surface of the membrane;
bipolar-plates formed to fit within the depression in corresponding ones of the plurality of flow-field plates such that each of the one or more membranes is between bipolar plates;

carbon felts positioned between the bipolar plates and the membranes; and a plurality of gaskets, each of the gaskets formed to engage adjacent pairs of the plurality of flow-field plates and seal the electrolyte channels.

17. The stack of claim 16, wherein seals surround each of the first electrolyte channels and the second electrolyte channels, the gasket sealing against the seals.

18. The stack of claim 17, wherein the gasket can be formed to accommodate bosses formed in the first electrolyte channels and the second electrolyte channels of each of the plurality of flow-field plates.

19. The stack of claim 16, further including a pair of end plates, the plurality of flow-field plates arranged to separate the pair of end plates.

20. The stack of claim 19, wherein the pair of end plates is compressed by compression frames.

21. The stack of claim 19, wherein the end plates each include a raised platform to mount a current collector, the current collector contacting a bipolar plate.

22. The stack of claim 19, further including an end gasket.

* * * * *